United States Patent [19]
Kohno et al.

[11] Patent Number: 5,728,217
[45] Date of Patent: Mar. 17, 1998

[54] APPARATUS FOR HARDENING COVERED SEEDS

[75] Inventors: Yasushi Kohno; Yoichi Ido; Kazushi Nakatsukasa, all of Susono, Japan

[73] Assignee: Yazaki Corporation, Tokyo, Japan

[21] Appl. No.: 757,507

[22] Filed: Nov. 27, 1996

[30] Foreign Application Priority Data

Nov. 29, 1995 [JP] Japan ................... 7-310700

[51] Int. Cl.$^6$ .................................................. A23G 3/00
[52] U.S. Cl. ............................ 118/13; 118/26; 118/29; 118/30; 118/31; 118/602; 118/423; 118/429
[58] Field of Search ........................ 118/13, 26, 29, 118/30, 31, 602, 423, 429, 23

[56] References Cited

U.S. PATENT DOCUMENTS 5,080,925  1/1992  Kouno .
5,421,882  6/1995  Kouno et al. .

FOREIGN PATENT DOCUMENTS 2 727 277  5/1996  France .

*Primary Examiner*—Laura Edwards
*Attorney, Agent, or Firm*—Armstrong, Westerman, Hattori, McLeland & Naughton

[57] ABSTRACT

The covered seed hardening apparatus of this invention has a construction suited for performing simultaneous parallel processes of hardening the gelling agent of seeds. The seeds covered with the gelling agent are dropped from the valves (73b) of the gel covering section (7) into the liquid hardener in the front half of the feed liquid tank (111a) on the reaction tank (111b) side of the flow regulating barrage (111g) in the hardening tank (111) of the gel hardening section (11). The covered seeds immersed in the hardener are moved through the hardener in the guide direction Y by the guide paddles (113b) after the guide paddles (113b) dip into the hardener in the reaction tank (111b) on the feed liquid tank (111a) side until the guide paddles (113b) move to a point in the reaction tank (111b) near the inclined surface (111m) of the hardner stopping barrage (111k) and come out of the hardener.

15 Claims, 19 Drawing Sheets

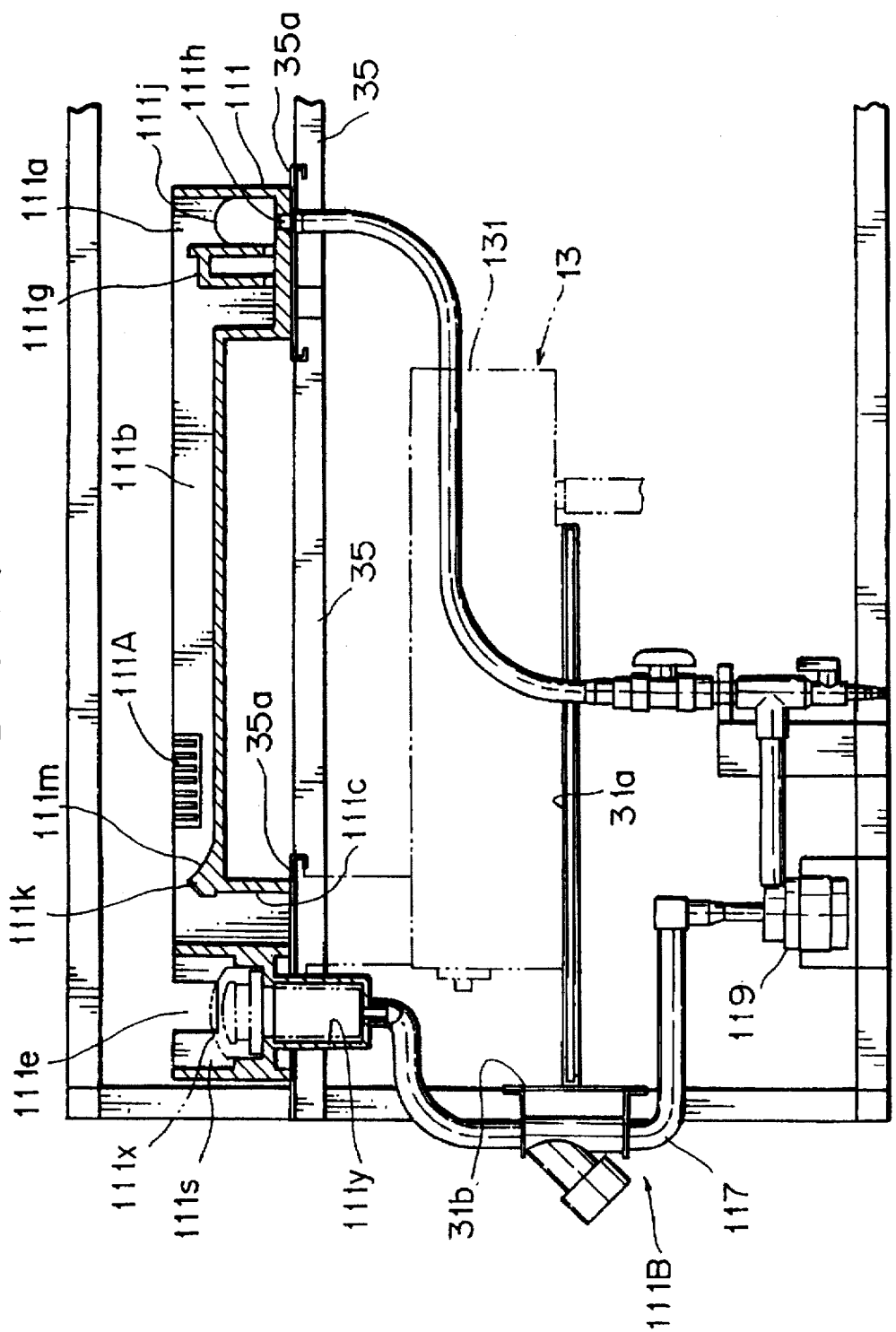

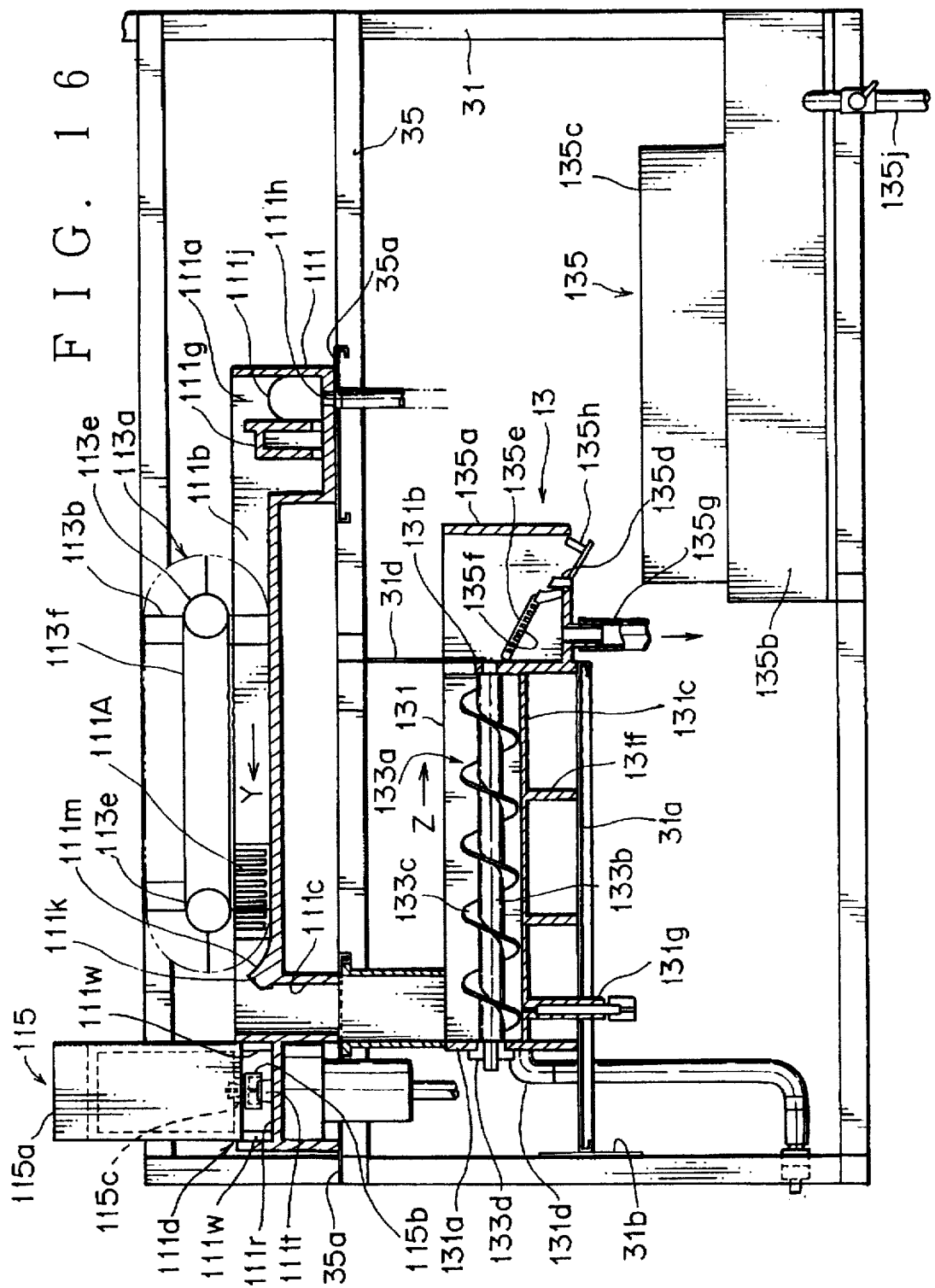

APPARATUS FOR HARDENING COVERED SEEDS

BACKGROUND OF THE INVENTION

1. Field of the Invention

The present invention relates to a covered seed hardening apparatus, into which seeds covered with a polymeric gelling agent are fed and in which the covered seeds are moved in a hardening agent stored in an internal reservoir to cause the gelling agent to react with the hardening agent to harden the gelling agent.

2. Description of the Related Art

Gel-covered seeds have been known which are seeds covered with a polymeric gelling agent that contains nutrients and sterilizers. Not only are the gel-covered seeds effective in protecting seeds against being eaten by animals and in sterilizing them, they have many other features, such as increasing the size of seeds for easy handling and efficient sowing and improving the rate of germination through absorption of nutritious substances in the gel.

Utilizing many features mentioned above, the applicant of this invention has proposed apparatuses for automatically covering seeds with gel. FIG. 22 shows a front view of an example conventional apparatus proposed by this applicant. In the figure, a gel-covering apparatus generally denoted A has a stand B, a seed hopper C, a seed transfer section D, a gelling agent tank E, a gel processing section F, a hardening tank G, and a water cleaning tank J.

The seed hopper C is supported vertically movable through an air cylinder C1 in the upper half of the stand B and is located slightly offset to one side from the center of the width of the stand B. The seed hopper C, as shown in FIG. 23, is almost circular in plan view and open upward and, as shown in FIG. 22, its lower part is nearly conical with its bottom lowering toward the center. The seed hopper C accommodates a large number of seeds (not shown) to be covered with gel. The gelling agent tank E is installed in the lower half of the stand B near the lateral side and contains a highly viscous liquid gelling agent to cover seeds.

The gel processing section F is installed in the upper half of the stand B at almost the center of the width of the stand B. The gel processing section F has a processing nozzle F1 whose interior is formed as a double tube. The processing nozzle F1 has its inner tube supplied with seeds from the upper end of the processing nozzle F1 and the outer tube supplied with a gelling agent from the gelling agent tank E through the side of the processing nozzle F1 and a tube not shown. In the gel processing section F, a plunger (not shown) in the processing nozzle F1 pumps a predetermined amount of the gelling agent out of the lower end of the outer tube while at the same time seeds are delivered one seed at a time from the lower end of the inner tube. As a result, seeds covered on the outer side with the gelling agent fall by their own weight.

The seed transfer section D has a rotary actuator D1 installed in the upper half of the stand B and located between the seed hopper C and the processing nozzle F1; a long rotary arm D3 rotatably supported at its intermediate part by the rotary actuator D1 so that it can rotate in a horizontal plane; and two disposable suction tips D5, D7 removably attached to the underside of both ends of the rotary arm D3. The seed transfer section D has the rotary actuator D1 turn the rotary arm D3 180 degrees at a time so that the rotary arm D3 assumes alternately a first state in which one of the suction tips D5 is located above the seed hopper C and the other suction tip D7 is located above the processing nozzle F1 and a second state in which the first suction tip D5 is located above the processing nozzle F1 and the second suction tip D7 is located above the seed hopper C.

The hardening tank G is installed at virtually a vertical center of the stand B and extends horizontally from below the processing nozzle F1, from which the gelling agent-covered seeds fall by their own weight, to the laterally other side of the stand B. In the hardening tank G a liquid hardener is flowing which reacts with the gelling agent coated over the seeds to harden the gelling agent and thereby form gel-covered seeds. Further, in the hardening tank G, there is rotatably installed a screw feeder G1, as shown in FIG. 23, which transfers the gel-covered seeds from below the processing nozzle F1 to the laterally other side in the hardening tank G.

On one side of the hardening tank G is arranged a reserve tank G5 containing a high-density hardener for adjusting the liquid level of the hardener in the hardening tank G. A tank holder G7 in which the reserve tank G5 is installed is connected to the upstream side and the downstream side of the flow of the hardener in the hardening tank G. When the liquid level of the hardening agent flowing from the upstream side of the hardening tank G into the tank holder G7 lowers below a reference level, the high-density hardening agent in the reserve tank G5 flows out into the tank holder G7 until the liquid level returns to the reference level, and is circulated to the downstream side of the hardening tank G.

The water cleaning tank J is located behind the hardening tank G and extends horizontally along the hardening tank G. In the water cleaning tank J water is flowing to clean the gel-coated seeds, whose gelling agent was hardened in the hardening tank G. Also in the water cleaning tank J a screw feeder J1 is rotatably installed to transfer the gel-covered seeds in a direction opposite to the direction in which the gel-covered seeds are fed in the hardening tank G.

In the conventional gel-covering apparatus A with the above construction, the seeds are covered with gel as follows.

In the first state of the seed transfer section D, the air cylinder C1 is activated to raise the seed hopper C and the first suction tip D5 is evacuated to a negative pressure to draw in the seeds from the seed hopper C. Then, the seed hopper C is lowered by the air cylinder C1, after which the rotary arm D3 is turned 180 degrees horizontally by the rotary actuator D1 to set the seed transfer section D in the second state. In this second state, the first suction tip D5 is set to a positive pressure to throw the picked-up seeds into the inner pipe of the processing nozzle F1 from the top. At the same time, the air cylinder C1 is activated to raise the seed hopper C, from which the seeds are drawn into the second suction tip D7 by setting the tip to a negative pressure. These operations are repeated to transfer the seeds from the seed hopper C to the processing nozzle F1. If the seeds in the seed hopper C fail to be sucked into the suction tips D5, D7 with the hopper raised by the air cylinder C1, the seed hopper C is vibrated up and down in small pitches to agitate the seeds to make them more accessible to the front end of the suction tips D5, D7.

At the same time that the seeds are thrown into the inner tube of the processing nozzle F1, the plunger is activated to pump a predetermined amount of gelling agent out of the front end of the processing nozzle F1 together with the seeds, causing the seeds to be covered with the gelling agent and fall by their own weight from the front end of the processing nozzle F1 into the hardening tank G. While the coated seeds that fell into the hardening tank G are moved by the screw feeder G1, the gelling agent adhering to the outer surface of the seeds is hardened so that the seeds are covered with gel. The gel-covered seeds that have reached the laterally opposite side in the hardening tank G are driven to the water cleaning tank J side riding over and crossing a separation wall G3 (see FIG. 23) between the hardening tank G and the water cleaning tank J by the rotation of the screw feeder G1 and the force of air blown out from an air blow opening not shown in synchronism with the rotation of the screw feeder G1.

The gel-covered seeds that were transferred to the water cleaning tank J are cleaned at their surfaces by a water flow made by the screw feeder J1 while being moved along the water cleaning tank J by the water flow. The gel-covered seeds that have reached the other end of the water cleaning tank J are then driven by the screw feeder J1 to ride over a separation wall J3 (FIG. 23) at the end of the water cleaning tank J and move into a discharge opening K (FIG. 23), from which the gel-covered seeds are recovered onto a product receiver (not shown) placed at the bottom of the gel-covering apparatus A. Further, the remaining amount of seeds in the seed hopper C is monitored at all times and, when it runs low, the seeds are supplied into the seed hopper C.

In the hardening tank G, as the gelling agent covering the surfaces of the seeds is immersed in the hardening agent for a predetermined time to react with it and harden, the density and amount of the hardening agent decrease. When the liquid level of the hardening agent in the tank holder G7 goes below the reference level, the high-density hardening agent in the reserve tank G5 flows out into the tank holder G7, from which it is supplied into the hardening tank G in an appropriate amount.

In the conventional gel-covering apparatus A that moves the gelling agent-covered seeds by the flow of liquid hardener produced by the screw feeder G1 in the hardening tank G, to ensure that the covered seeds thrown in the hardening tank G are carried by the flow of the liquid hardener produced by the screw feeder G1, the width of the hardening tank G cannot be expanded greatly from the diameter of the spiral blade of the screw feeder G1. Hence, when the hardening tank G is increased in size to allow simultaneous parallel transfer of covered seeds through the liquid hardener, as part of an effort to improve the processing capacity of the gel-covering apparatus A, it is necessary to increase not only the plan-view size of the hardening tank G but its height as well according to the increased diameter of the screw feeder G1, resulting in an intolerable increase in equipment size.

In the conventional gel-covering apparatus A using the screw feeder G1, as shown in FIG. 23, a part of the spiral blade of the screw feeder G1 corresponding to a half pitch hides the surface of the liquid hardener so that some gelling agent-covered seeds cannot reach the hardener. Therefore, depending on whether or not the timing the covered seeds are thrown into the hardening tank G coincides with the rotation cycle of the screw feeder G1, variations occur in the duration of time in which the covered seeds are immersed in the hardener, i.e., the time in which the gelling agent of the seeds reacts with the hardener. This in turn will result in variations in the degree of hardness of the gel-covered seeds after hardening reaction and therefore in the growth of the seeds after being sowed, such as the timing of germination.

Further, in the conventional gel-covering apparatus A, when the overall amount of the liquid hardener decreases as the density of the hardener in the hardening tank G is lowered, the high-density hardener in the reserve tank G5 is supplied directly into the flow of hardener in the hardening tank G, so that the density of the hardener changes greatly while the covered seeds are moved in the hardening tank G by the flow of hardener generated by the screw feeder G1. Like the variations in the length of time during which the covered seeds are immersed in the hardener, the variation in the density of the hardener causes variations in the hardness of the gel covering the seeds after being hardened, giving rise to variations in the growth of the seeds sown, such as germination timing.

The present invention has been accomplished under the above-mentioned circumstances and the primary objective of this invention is to provide a covered seed hardening apparatus which is suited for performing simultaneous parallel processes of hardening gelling agent of the seeds. A second objective of this invention is to provide a covered seed hardening apparatus that can keep constant the time in which the covered seeds are immersed in the liquid hardener in the process of hardening the gelling agent on the seeds through reaction with hardener. A third objective of this invention is to provide a covered seed hardening apparatus which can adjust virtually automatically the density and amount of hardener in the hardening tank used to harden the gelling agent through reaction with it, without affecting the process of hardening the covered seeds in the hardener.

SUMMARY OF THE INVENTION

To achieve the first objective, the covered seed hardening apparatus of the present invention, comprises: a hardening tank containing a liquid hardener for hardening polymeric gelling agent that covers seeds to be processed; guide paddles having a width corresponding to a width dimension of the hardening tank, the width direction of the hardening tank crossing a direction in which the covered seeds are moved in the hardener, the guide paddles extending in a width direction parallel to the width direction of the hardening tank; and a paddle drive mechanism for moving the guide paddles in the harder in the hardening tank from a guide start point to a guide end point to move the covered seeds through the hardener; wherein the seeds covered with the polymeric gelling agent are thrown into the hardener in the hardening tank at the guide start point and moved by the guide paddles in the hardener from the guide start point toward the guide end point to cause the gelling agent of the seeds to react with the hardener and harden.

To achieve the second objective, the covered seed hardening apparatus of the present invention, is characterized as follows. The paddle drive mechanism comprises a pair of pulleys whose axes are directed in the width direction of the hardening tank and which are installed at locations corresponding to the guide start point and the guide end point, a belt wound around the pair of pulleys, and a circulation drive source for circulating the belt through the pulleys, the belt comprising two halves situated between the pair of pulleys and so disposed that a first half of the belt faces the hardener and a second half of the belt faces the hardener through the first half of the belt; the guide paddles are erected on an outer circumferential surface of the belt at intervals in the circulation direction of the belt by the circulation drive source with the width direction of the guide paddles aligned with a rotating axis direction of the pulleys; the guide paddles erected on the second half of the belt are situated outside the hardener and moved from the guide end point toward the guide start point by the circulation drive source; and the guide paddles erected on the first half of the belt are situated in the hardener and moved from the guide start point toward the guide end point by the circulation drive source.

Further, the covered seed-hardening apparatus of the present invention, is characterized as follows. The paddle drive mechanism comprises a plurality of rollers spaced in the direction of movement of the covered seeds, with axes of the rollers directed in the width direction of the hardening tank, and a rotation drive source for rotating the rollers in the same rotation directions; the guide paddles are erected on a circumferential surface of each of the rollers at intervals in the circumferential direction, with the width direction of the paddles aligned in a rotation axis direction of the rollers; the rollers are so disposed that the guide paddles erected on a first circumferential part of the rollers facing the hardener are situated in the hardener and that the guide paddles erected on a second circumferential part of the rollers opposite the first circumferential part with the rotating axis of each roller between the opposing first and second circumferential parts are situated outside the hardener; and the guide paddles situated in the hardener are moved in the hardener by the rotation drive source in the seed moving direction.

Further, the covered seed hardening apparatus of the present invention, is characterized as follows. A hardner stopping barrage is formed at a hardening tank portion downstream, in the seed moving direction, of the guide end point to prevent outflow of the hardener to the downstream side of the hardening tank portion; a barrage surface on the guide start point side of the hardner stopping barrage is formed following the locus of the front end of the guide paddles moving from within the hardener to the outside; and at a hardening tank portion downstream, in the seed moving direction, of the hardner stopping barrage a seed dropping port communicating with the outside of the hardening tank is formed; and the covered seeds at the guide end point are pushed by the guide paddles to ride over the barrage surface and come out of the hardener together with the guide paddles and, as the guide paddles rise above the hardner stopping barrage, the covered seeds fall from the guide paddles into the seed dropping port.

To achieve the third objective, the covered seed hardening apparatus of the present invention, further comprises: a return passage for returning the hardener at a hardening tank portion upstream, in the seed moving direction, of the hardner stopping barrage to the guide start point; and a reserve tank for holding a density adjusting hardener used to adjust the density of the hardener in the hardening tank, the reserve tank having a tank opening facing from above the hardener in the return passage; wherein when the level of the liquid hardener in the return passage parts from the tank opening, the density adjusting hardener flows out of the reserve tank into the return passage by its own weight through the tank opening and, when the level of the liquid hardener in the return passage reaches the tank opening, the outflow of the density adjusting hardener from the reserve tank is stopped by the pressure of the hardener in the return passage applied through the tank opening.

Further, the covered seed hardening apparatus of the present invention, is characterized in that the guide paddles are formed with slits smaller in width than at least the covered seeds.

The covered seed hardening apparatus of the present invention, comprises: a hardening tank containing a liquid hardener for hardening polymeric gelling agent that covers seeds to be processed; a return passage for returning the hardener from a guide end point to a guide start point; and a reserve tank for holding a density adjusting hardener used to adjust the density of the hardener in the hardening tank, the reserve tank having a tank opening facing from above the hardener in the return passage; wherein the seeds covered with the polymeric gelling agent are thrown into the hardener in the hardening tank at the guide start point and moved in the hardening agent from the guide start point to the guide end point to cause the gelling agent of the seeds to react with the hardener and harden, and the covered seeds with the hardened gelling agent are moved out of the hardener at the guide end point; and wherein when the level of the liquid hardener in the return passage parts from the tank opening, the density adjusting hardener flows out of the reserve tank into the return passage by its own weight through the tank opening and, when the level of the liquid hardener in the return passage reaches the tank opening, the outflow of the density adjusting hardener from the reserve tank is stopped by the pressure of the hardener in the return passage applied through the tank opening.

With the covered seed hardening apparatus when the covered seeds thrown in the liquid hardener at the guide start point of the hardening tank are moved in the flow of hardener flowing from the guide start point toward the guide end point, this is achieved by the guide paddles that are moved in the liquid hardener by the paddle drive mechanism from the guide start point toward the guide end point, thereby guiding the covered seeds through the hardener from the guide start point to the guide end point.

Because the guide paddles have their width sized corresponding to the width of the hardening tank whose width direction crosses the direction in which the covered seeds are moved in the hardener, and because the guide paddle width extends in the width direction of the hardening tank, the covered seeds in numbers corresponding to the ratio between the size of width of the guide paddles and the size of covered seeds can be moved through the hardener by the guide paddles from the guide start point to the guide end point.

In the covered seed hardening apparatus the guide paddles are erected on the outer surface of the belt that makes up the paddle drive mechanism, the belt is wound around a pair of pulleys making up the paddle drive mechanism, and the belt is circulated by the circulation drive source through the pulleys. The guide paddles erected on that half of the belt situated between the pair of pulleys which faces the hardener are moved in the hardener from the guide start point to the guide end point to move the covered seeds through the hardener. Hence, by adjusting the circulation time of the belt driven by the circulation drive source, it is possible to keep constant the time during which the covered seeds are immersed in the hardener to harden the gelling agent of the seeds through reaction with hardener.

In the part of the hardening tank excluding the dip portion ranging from the guide start point to the guide end point, the guide paddles are disposed outside the hardener, so that the movement of the guide paddles in this part of the hardening tank excluding the dip portion does not disturb the flow of the hardener.

Further, in the covered seed hardening apparatus, the guide paddles are erected on the circumferential surfaces of a plurality of rollers making up the paddle drive mechanism and these rollers are driven by the rotation drive source making up the paddle drive mechanism to cause the guide paddles, erected on that part of the circumferential surface of the rollers which faces the hardener, to be moved through the liquid hardener in the seed moving direction to guide the covered seeds through the hardener. Hence, by adjusting the rotation time of the rollers driven by the rotation drive source, it is possible to keep constant the time during which the covered seeds are immersed in the hardener to harden the gelling agent of the seeds through reaction with the hardener. Like the covered seed hardening apparatus, in a part of the hardening tank excluding the dip portion ranging from the guide start point to the guide end point, the guide paddles are disposed outside the hardener, so that the movement of the guide paddles in this part of the hardening tank excluding the dip portion does not disturb the flow of the hardener.

In the covered seed hardening apparatus, as the guide paddles moves out of the liquid hardener at the guide end point of the hardening tank, the covered seeds are carried by the guide paddles, moving along the inclined barrage surface of the water stopping barrage and getting out of the liquid hardener together with the guide paddles. When the front end of the guide paddles rises above the top of the water stopping barrage, the covered seeds fall from the guide paddles into the seed dropping port on the downstream side of the water stopping barrage and are discharged below the hardening tank. The mechanism for bringing the covered seeds out of the hardener can be served by the guide paddles that has a primary function of guiding the covered seeds through the hardener from the guide start point to the guide end point.

In the covered seed hardening apparatus, when the liquid level of the return passage, that communicates with the hardening tank and returns the hardener from the guide end point in the hardening tank to the guide start point, parts from the tank opening of the reserve tank, the density adjusting hardener flows from the reserve tank into the return passage until the liquid level reaches the tank opening. The density adjusting hardener in the reserve tank flows into the hardener in the return passage that excludes the dip portion of the hardening tank where the covered seeds are moved immersed ranging from the guide end point to the guide start point, so that the density of hardener in the dip portion is prevented from changing while the covered seeds are moving.

Hence, the degree of hardness of the gelling agent on the seeds is free of variations, which would otherwise result from large variations in the density of hardener in the dip portion produced when the covered seeds are being moved. It is therefore possible to adjust virtually automatically the density and amount of the liquid hardener in the hardening tank without affecting the process of hardening the covered seeds in the hardener. The similar effect can be produced also by the covered seed hardening apparatus.

In the covered seed hardening apparatus of this invention, when the guide paddles move through the hardener, the covered seeds greater than the slit width of the guide paddles are guided through the hardener from the guide start point to the guide end point while at the same time the hardener on the guide end point side of the guide paddles is allowed to escape through the slits to the guide start point side of the guide paddles. This operation reliably guides the covered seeds through the liquid hardener without disturbing the flow of the hardener.

The above and other objects, features and advantages of this invention will become apparent from the following description and the appended claims, taken in conjunction with the accompanying drawings in which like parts or elements are denoted by like reference characters.

BRIEF DESCRIPTION OF THE DRAWINGS

FIG. 15 is a cross section taken along the line A—A of FIG. 14;

FIG. 16 is a cross section taken along the line B—B of FIG. 14

DESCRIPTION OF THE PREFERRED EMBODIMENTS

Now, the apparatus for hardening covered seeds according to this invention will be described in conjunction with preferred embodiments by referring to the accompanying drawings of this specification.

Figure 1:
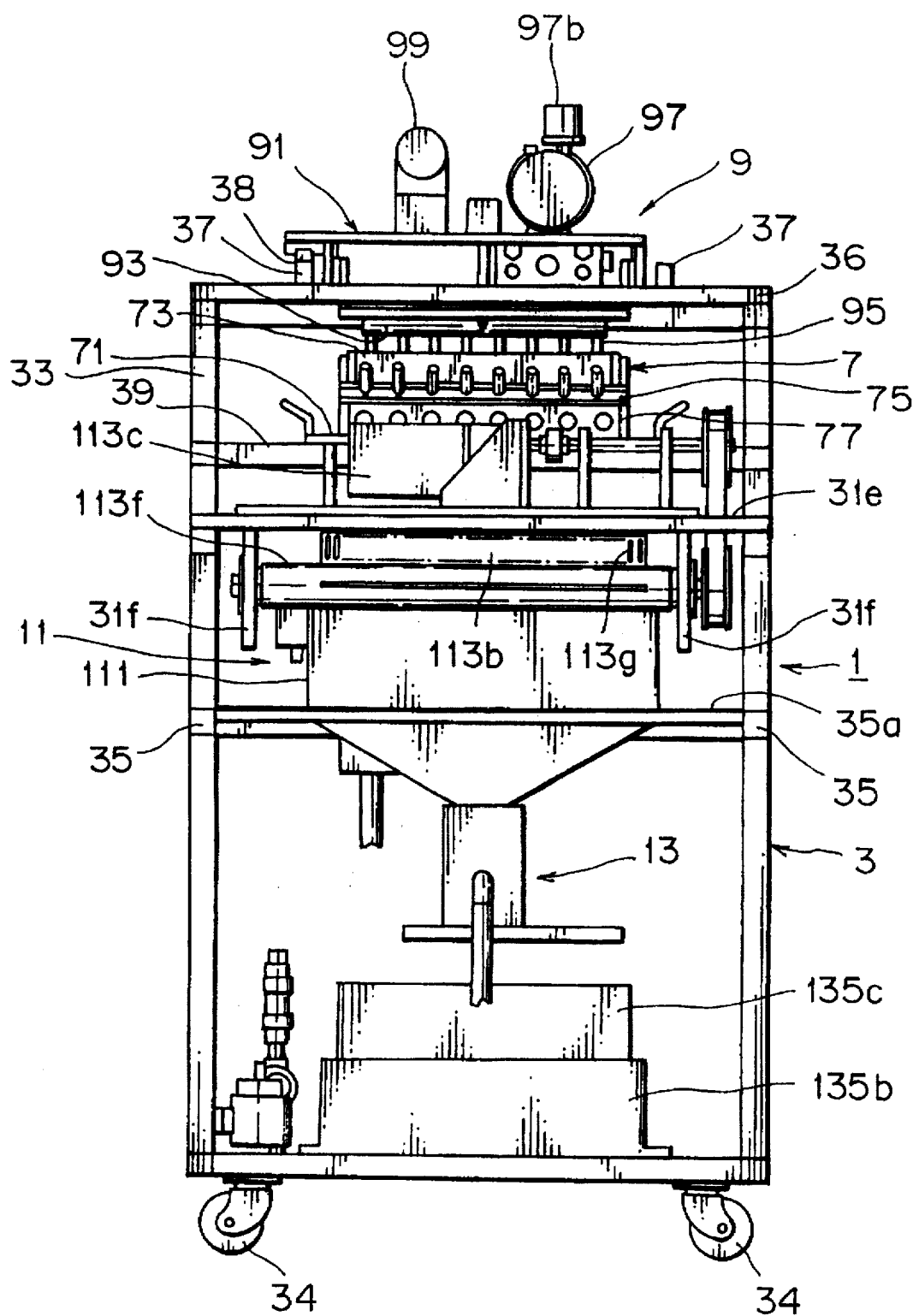
FIG. 1 is a front view showing the outline configuration of the apparatus for covering seeds with gel, which adopts the hardening apparatus of one embodiment of this invention.
Figure 2:
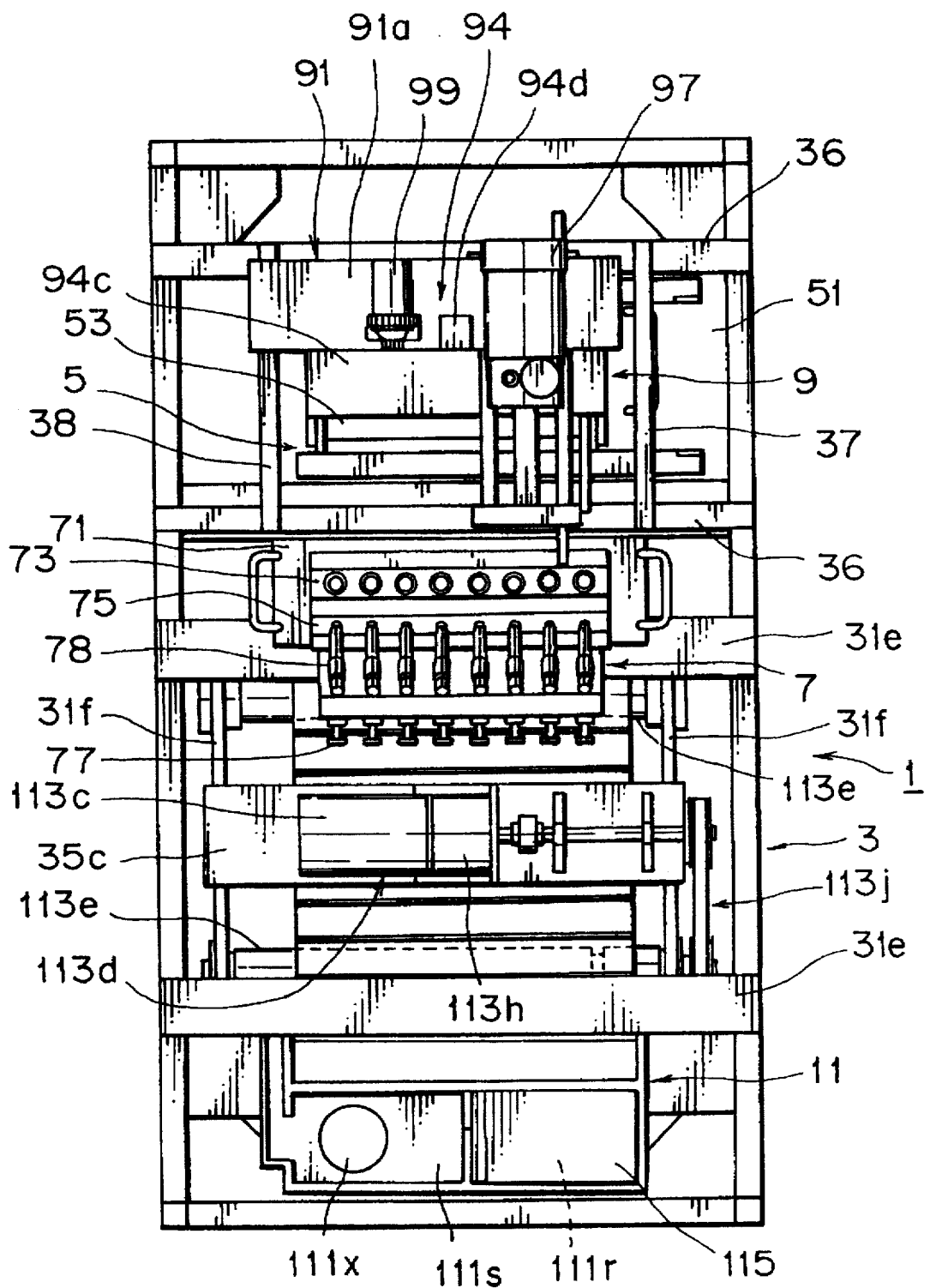
FIG. 2 is a plan view of the apparatus for covering seeds with gel shown in FIG. 1.
Figure 3:
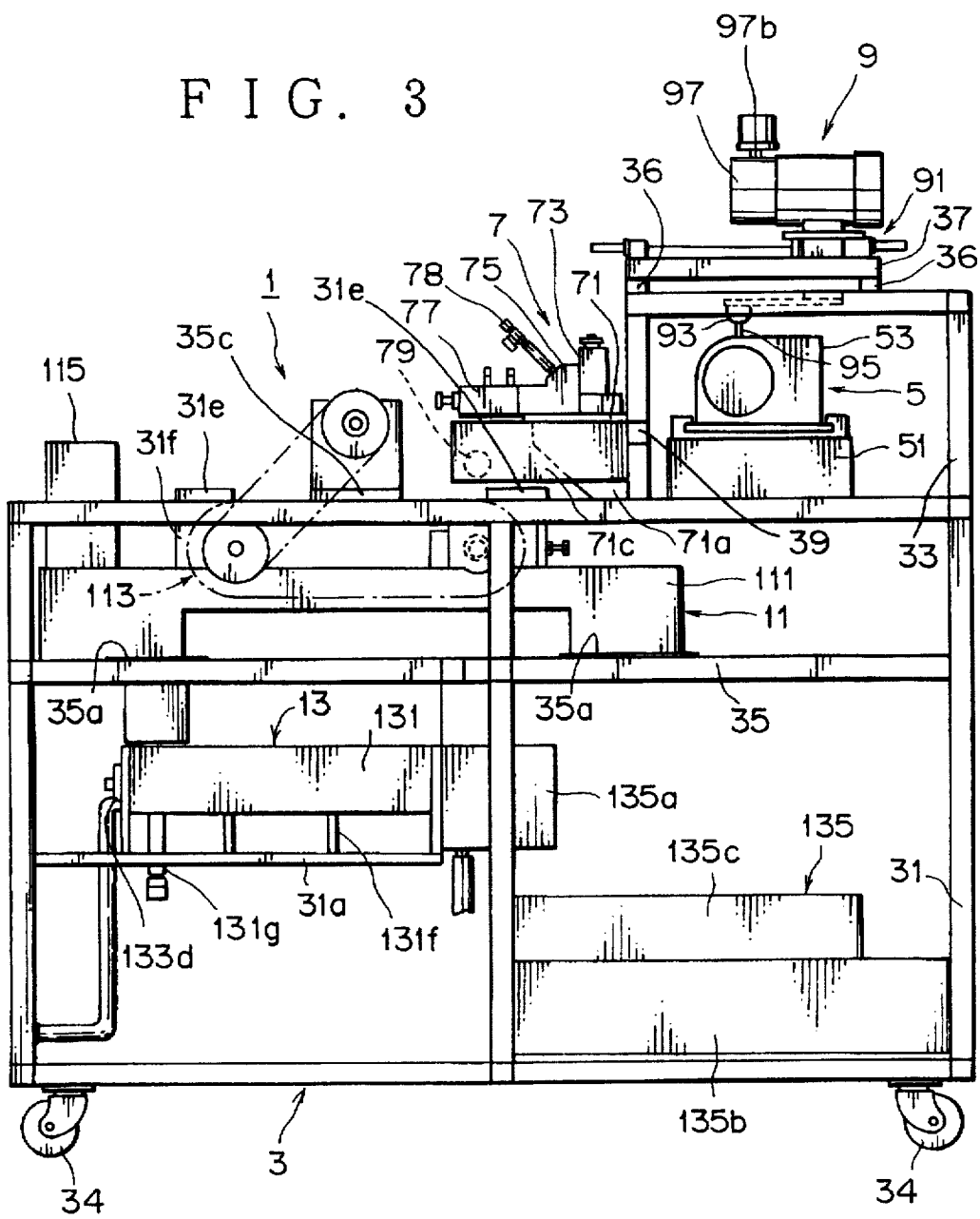
FIG. 3 is a side view of the apparatus for covering seeds with gel shown in FIG. 1.

FIG. 1 is a front view showing an outline configuration of the apparatus for covering seeds with gel that employs a gel hardening apparatus as one embodiment of this invention. FIG. 2 and FIG. 3 are a plan view and a side view of the same, respectively. In the figures, a gel-covering apparatus of this embodiment generally denoted 1 has a stand 3, a seed supply section 5, a gel covering section 7, a seed transfer section 9, a gel hardening section 11, and a gel cleaning section 13.

The stand 3, as shown in FIG. 3, is formed of a frame that is open to its sides. The frame consists of a main frame 31, which is virtually a rectangle in plan view that is elongate in a longitudinal direction, and an auxiliary frame 33 erected on the main frame 31 near its rear end. The main frame 31 is supported transportable by casters 34 at four corners of the frame bottom. A lateral reinforcement frame 35 is horizontally mounted slightly above the vertical center of the main frame 31. As shown in the enlarged plan view of the auxiliary frame and the seed transfer section of FIG. 4, main upper crosspieces 36 are horizontally laid between the left and right sides of the auxiliary frame 33 at the front end and slightly in front of the rear end of the auxiliary frame 33.

Figure 4:
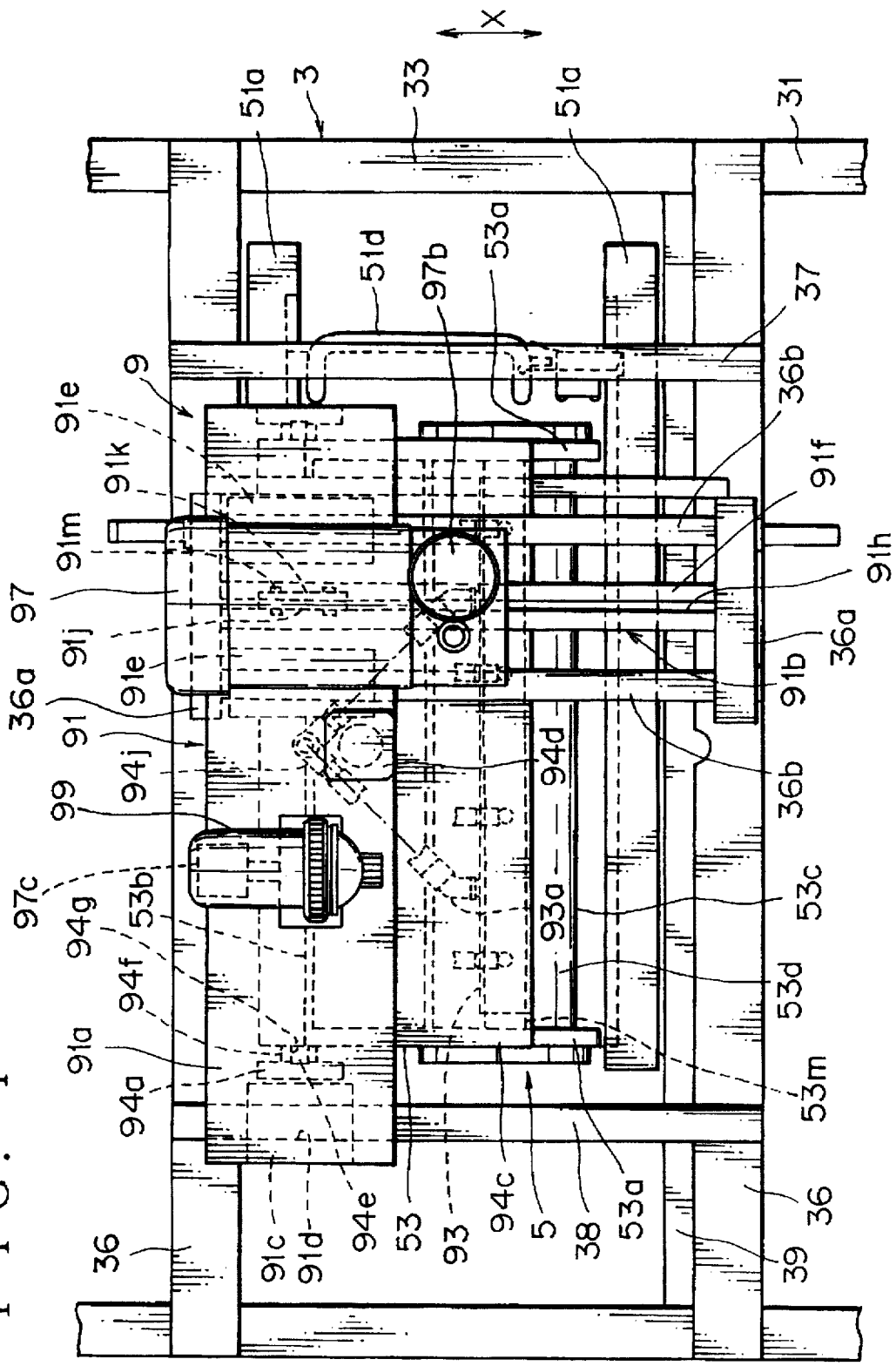
FIG. 4 is an enlarged plan view of an auxiliary frame and a seed transfer section shown in FIG. 2.

Two sub-upper crosspieces 37 are horizontally laid connecting the front and rear main upper crosspieces 36 at positions spaced in the lateral direction of the auxiliary frame 33 to reinforce the main upper crosspieces 36. On the left sub-upper crosspiece 37 is supported a guide rail 38 (FIG. 5) that extends parallel with this sub-upper crosspiece 37. As shown in FIG. 1, a front lateral cross piece 39 is horizontally mounted between the front, lateral side portions of the auxiliary frame 33 at a level slightly lower than the vertical center of the auxiliary frame 33. Support plates 36a are placed, as shown in FIG. 4, on the main upper crosspieces 36 at positions slightly off-centered laterally toward the right sub-upper crosspiece 37. Spanning horizontally between the support plates 36a are two laterally spaced guide shafts 36b that extends parallel to each other.

The seed supply section 5 is to supply seeds that are to be processed into gel-covered seeds and, as shown in FIG. 3, is located inside the auxiliary frame 33 on the main frame 31. The seed supply section 5 has a base 51 securely fixed on the main frame 31 and a seed tank 53 fixed on the base 51.

Figure 5:
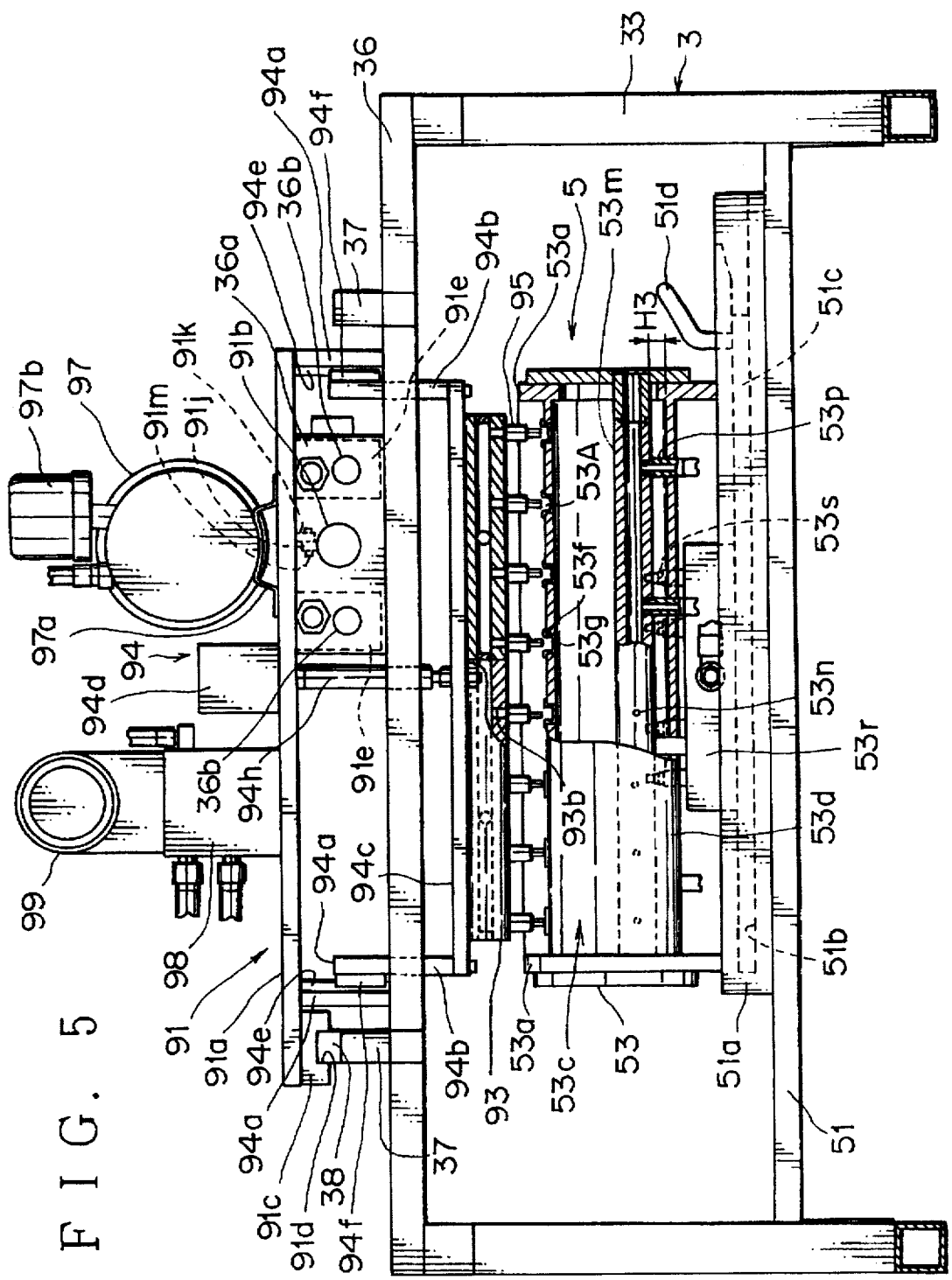
FIG. 5 is a partly cutaway, enlarged front view of a seed supply section and the seed transfer section shown in FIG. 2.
Figure 6:
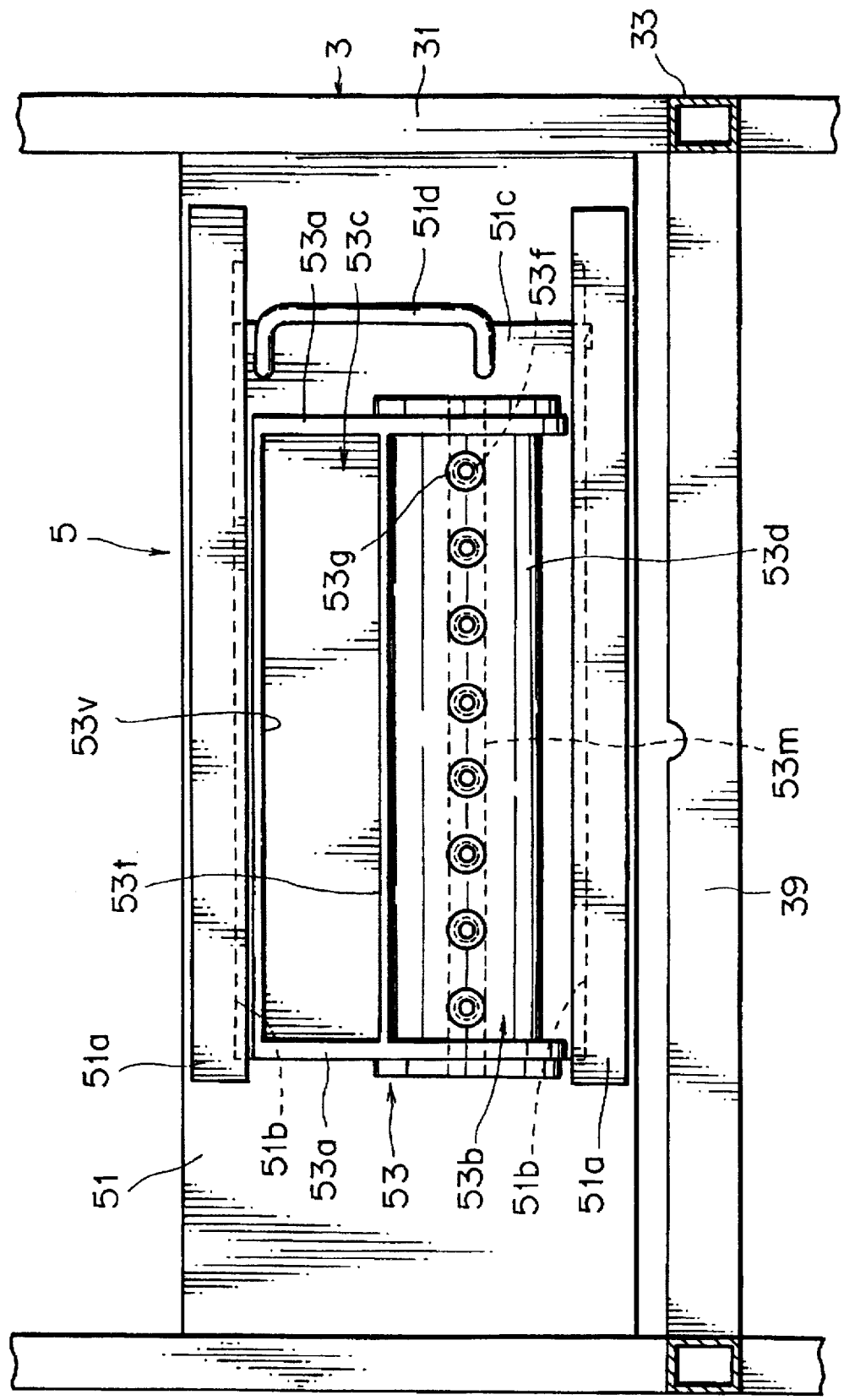
FIG. 6 is an enlarged plan view of the seed supply section shown in FIG. 2.
Figure 7:
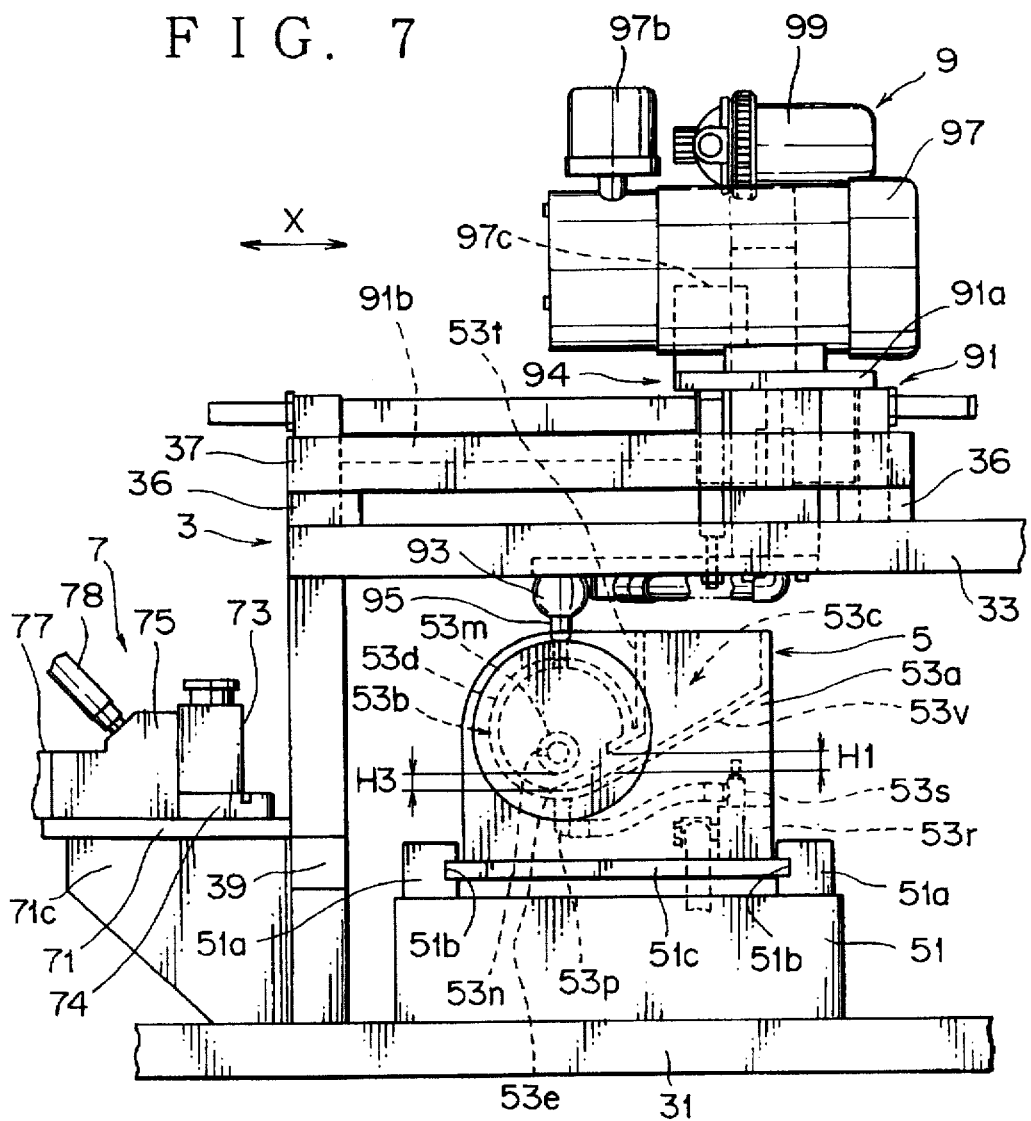
FIG. 7 is an enlarged side view of the seed supply section and the seed transfer section shown in FIG. 2.

FIG. 5 is an enlarged front view of the seed supply section and the seed transfer section. FIG. 6 is an enlarged plan view of the seed supply section. FIG. 7 is an enlarged side cross section of the seed supply section and the seed transfer section. The base 51, as shown in FIG. 6, is virtually a rectangle which is laterally long in plan view extending between the lateral side portions of the main frame 31. Parallel guide rails 51a are attached to the front and rear ends of the base 51.

The base 51 has formed on the inner opposing sides of the guide rails 51a guide grooves 51b which are U-shaped in cross section and extend over the entire length of the guide rails 51a as shown in FIG. 6 and 7. Between these guide rails 51a is supported a slide plate 51c whose front and rear ends are fitted in the corresponding guide grooves 51b so that the slide plate 51c can be drawn out toward the right side of the main frame 31.

In FIG. 6, denoted 51d is a handle used to pull the slide plate 51c.

The seed tank 53 is mounted on the slide plate 51c and made, for example, of an acrylic resin plate and has a pair of side walls 53a erected from the sides of the slide plate 51c as shown in FIG. 5 and a tank body portion 53b and a hopper portion 53c both formed between the side walls 53a, as shown in FIG. 6.

The tank body portion 53b is virtually a laterally long cylinder formed of a cylindrical circumferential wall 53d closed at the ends with the side walls 53a, as shown in FIG. 6. The circumferential wall 53d has a horizontally long slit 53e formed in the lower part of the tank body portion 53b between the side walls 53a, as shown in FIG. 7. The slit 53e has a vertical width H1. The top part of the circumferential wall 53d is formed with eight through-holes 53f, virtually circular in plan view and arranged laterally at equal intervals, as shown partly cutaway in FIG. 5. Each of the through-holes 53f is removably fitted with an annular adapter 53g, which has a hole 53A almost at the center.

Figure 8:
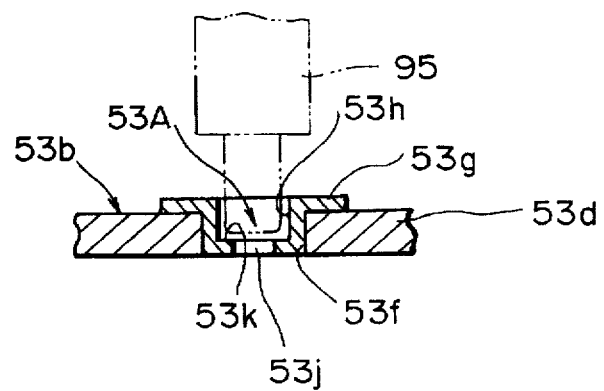
FIG. 8 is an enlarged cross section of an adapter shown in FIG. 5.

The inner circumferential surface of the hole 53A of the adapter 53g has a large-diameter portion 53h on the outer side of the circumferential wall 53d of the tank body portion 53b and a small-diameter portion 53j on the inner side, as shown in an enlarged cross section of FIG. 8. There is a step portion 53k at the boundary between the large-diameter portion 53h and the small-diameter portion 53j. There are prepared two or more kinds of adapters 53g with differing inner diameters of the holes 53A. According to the size of the seeds accommodated in the tank body portion 53b, the adapters 53g with the smallest of the small-diameter portions 53j through which the seeds can pass are selectively installed in the through-holes 53f.

Further, as shown in FIG. 7, laid in the tank body portion 53b between the side walls 53a is a cylindrical air chamber 53m which is sufficiently smaller in diameter than the tank body portion 53b and is held a small distance H3 almost equal to the vertical width H1 of the slit 53e above the bottom inner circumferential surface of the tank body portion 53b. The air chamber 53m is divided at nearly the center between the side walls 53a into two lateral portions. The left and right air chamber 53m portions are formed with laterally aligned and equally spaced blow ports 53n at their front circumferential part on a side opposite the slit 53e side.

Each of the divided air chamber 53m portions is connected at their bottom with the ends of two joints 53p, as shown in FIG. 5. These joints 53p pierce through the bottom of the tank body portion 53b and extend outside, with the other ends of the joints 53p connected through a high-pressure hose not shown to four joints 53s in a manifold 53r which is located adjacent to the rear side of the tank body portion 53b and securely mounted on the base 51, as shown in FIG. 7. The manifold 53r is supplied compressed air from an external air compressor (not shown) outside the gel-covering apparatus 1 through a pressure reducer not shown. The compressed air is supplied to each of the divided air chamber 53m portions through the joints 53s, 53p and high-pressure hose.

The hopper portion 53c is formed by a front plate 53t, which is almost vertically erected from the circumferential wall 53d at the upper side of the slit 53e in the tank body portion 53b, and a rear plate 53v, which is inclined upwardly rearward from the lower side of the slit 53e, extending progressively away from the tank body portion 53b, with its front end portion rising nearly vertically. The rear plate 53v extends in a tangential direction of the circumferential wall 53d portion that extends from near the bottom of the tank body portion 53b in a rear upper direction. The rear plate 53v is formed integrally with the circumferential wall 53d.

The gel covering section 7 is to cover seeds with gelling agent to form gel-covered seeds and includes, as shown in FIG. 3, a base 71 arranged on the main frame 31 in front of the auxiliary frame 33 and extending between the left and right ends of the main frame 31; a nozzle block 73 arranged on the base 71; a gel accommodating block 75 mounted securely on the base 71 in front of the nozzle block 73; eight pressurizing air cylinders 77 and eight air vent valves 78 connected to the gel accommodating block 75; and a manifold 79 for supplying gelling agent to the gel accommodating block 75.

Figure 9:
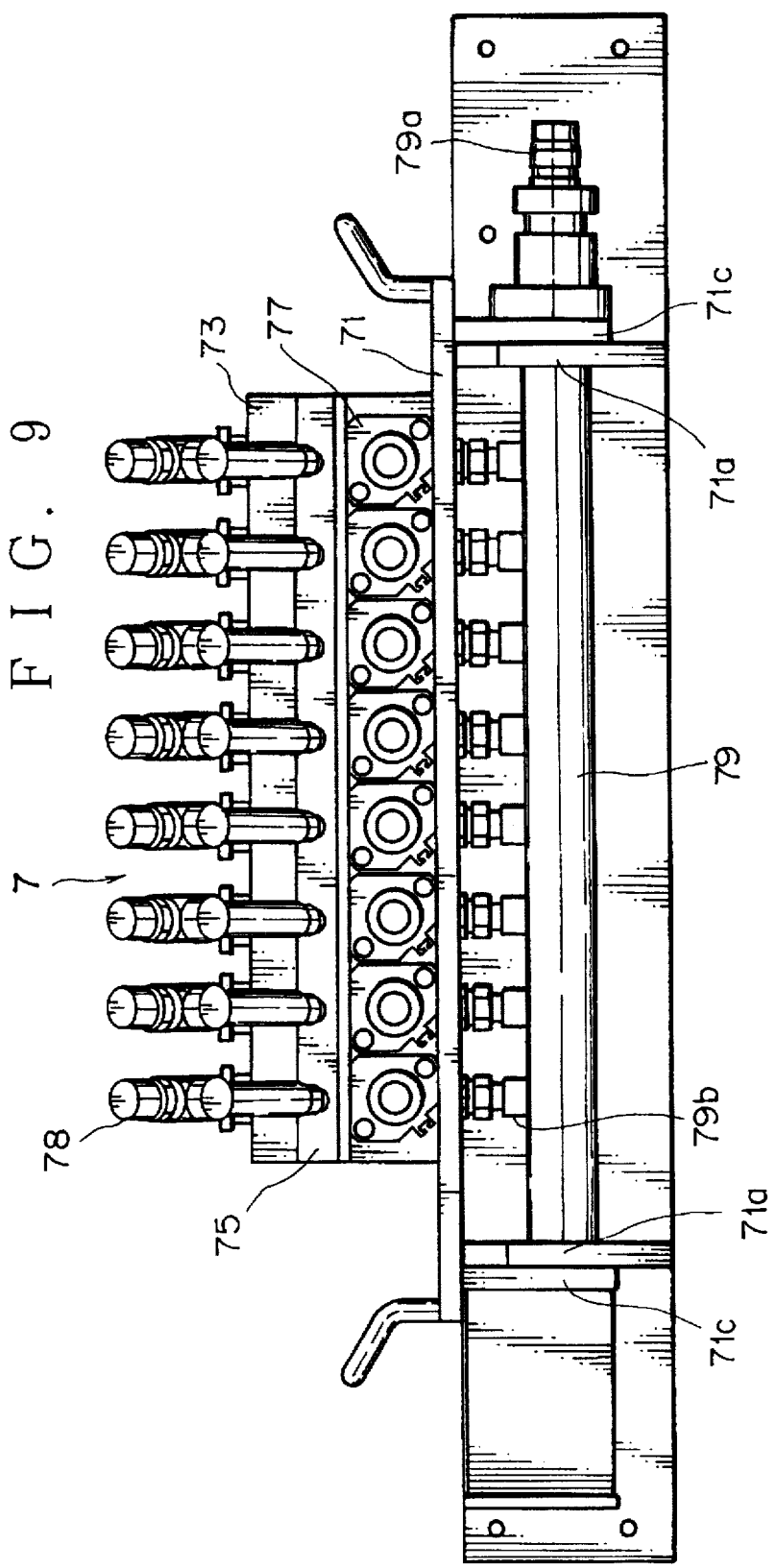
FIG. 9 is an enlarged front view of a gel covering section shown in FIG. 2.
Figure 10:
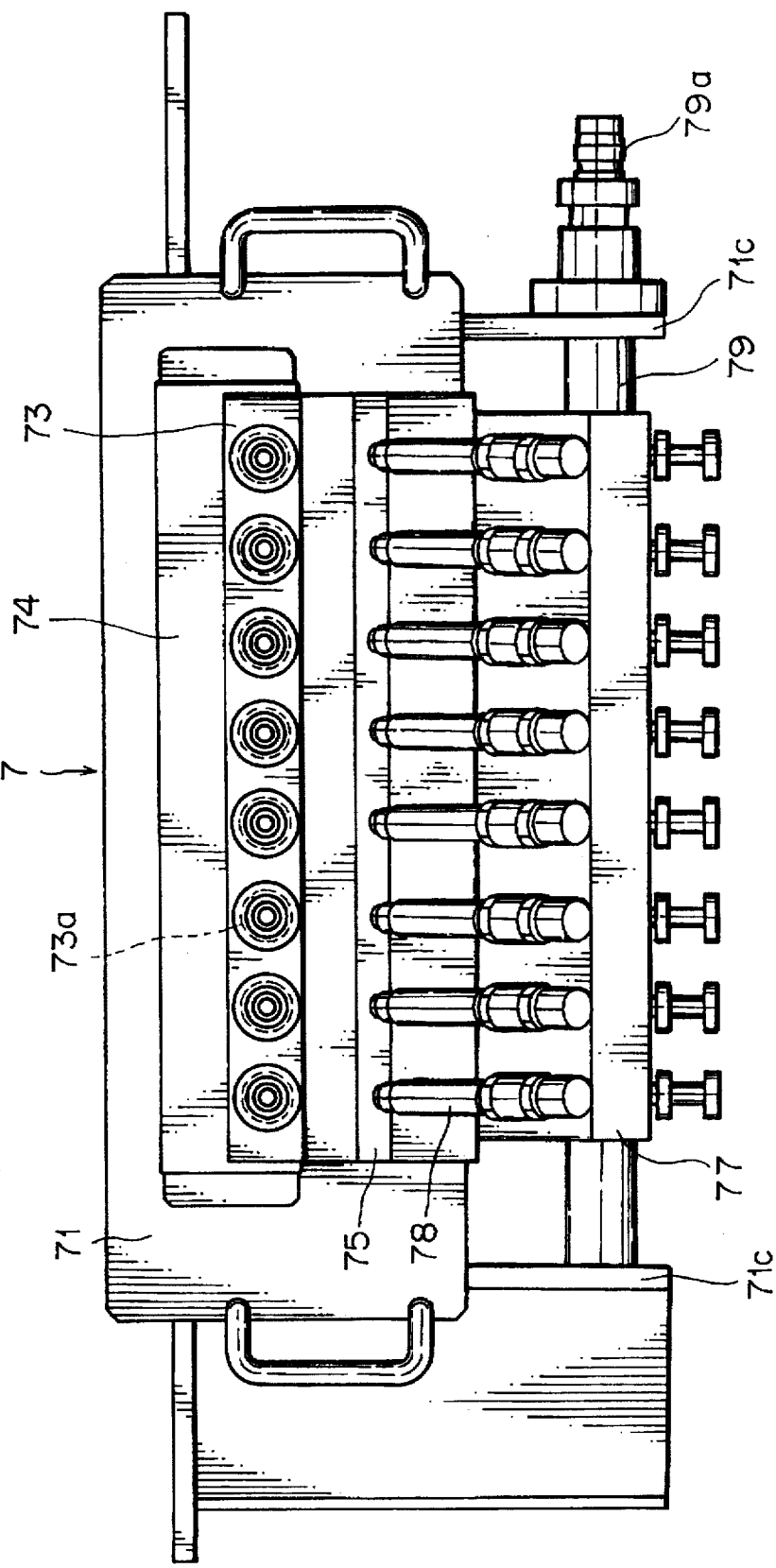
FIG. 10 is an enlarged plan view of the gel covering section shown in FIG. 2.
Figure 11:
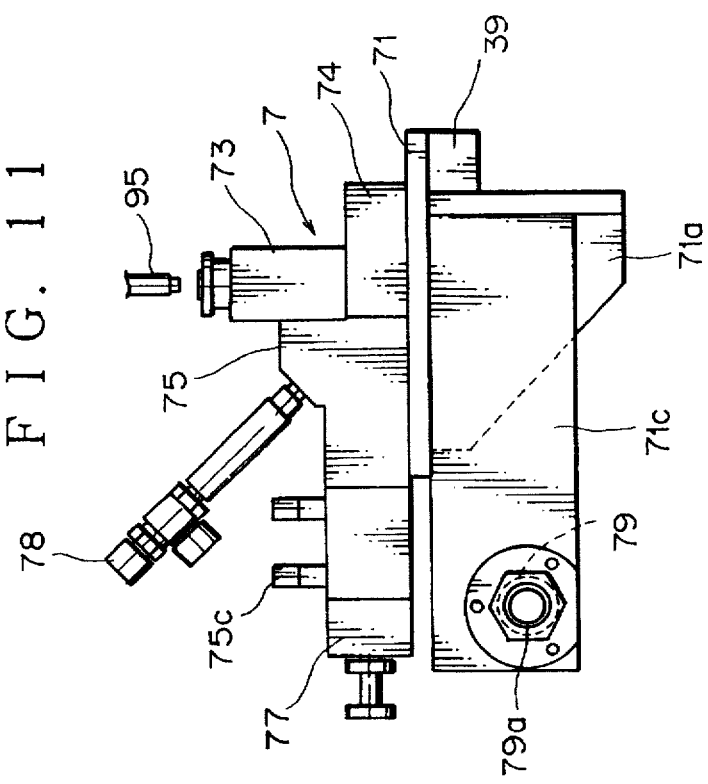
FIG. 11 is an enlarged side view of the gel covering section shown in FIG. 2.

FIG. 9 is an enlarged front view of the gel covering section, FIG. 10 is an enlarged plan view of the same, and FIG. 11 is an enlarged side view of the same. The base 71 is, as shown in FIG. 10, virtually a rectangle which is laterally long in plan view. The rear end of the base 71, as shown in FIG. 3, is secured to the front lateral cross piece 39 of the auxiliary frame 33. In this state, the base 71 is supported horizontal by two left and right reinforcement plates 71a projecting downwardly from the front lateral sides of the front lateral cross piece 39 of the auxiliary frame 33, as shown in FIG. 11.

The nozzle block 73 is arranged on a gate-shaped base frame 74 installed between the left and right ends of the base 71 and, as shown in FIG. 10, is virtually a rectangle in plan view which is laterally long and longitudinally shorter than the base 71. The upper surface of the nozzle block 73 is formed with eight laterally and equally spaced seed injection ports 73a. The underside portion of the nozzle block 73 corresponding to the seed injection ports 73a are formed with valves 73b which have smaller inner diameters than the seed injection ports 73a, as shown in the enlarged side cross section of FIG. 12. The nozzle block 73 has eight passages 73c passing vertically therethrough to connect the seed injection ports 73a and the corresponding valves 73b.

Each of the passages 73c has a large-diameter portion 73d communicating with and almost equal in diameter to the seed injection port 73a and a small-diameter portion 73e communicating with the valve 73b and slightly larger in diameter than the valve 73b and smaller than the large-diameter portion 73d. The inner circumferential surface of the passage 73c is formed with a step portion 73f between the large-diameter portion 73d and the small-diameter portion 73e at a location slightly off-centered vertically toward the seed injection port 73a. The large-diameter portion 73d is formed with a female screw 73g.

In each of the passages 73c a cylindrical plunger 73h is installed vertically movable. The plunger 73h has an outer diameter corresponding to the inner diameter of the small-diameter portion 73e. On the outer circumference of the plunger 73h is formed a flange 73j that has an outer diameter corresponding to the inner diameter of the large-diameter portion 73d of the passage 73c. One end portion of the plunger 73h a certain distance from this flange 73j is formed into a small-diameter portion 73k which is smaller in outer diameter than the other end.

The plunger 73h is inserted into the passage 73c from above through the seed injection port 73a with its small-diameter portion 73k directed downward. With the flange 73i engaged with the step portion 73f of the passage 73c, the upper end (second end) of the plunger 73h projects upwardly from the seed injection port 73a, the lower end (first end) of the plunger 73h, i.e., the lower end of the small-diameter portion 73k, is virtually flush with the underside of the nozzle block 73 and the circumferential surface of the lower end of the plunger 73h fits tightly in the inner circumferential surface of the valve 73b without a gap, closing the valve 73b. In this condition, an annular space 73m is defined between the small-diameter portion 73e of the passage 73c and the small-diameter portion 73k of the plunger 73h. This space 73m communicates through the passage 73n to the front side of the nozzle block 73 on the gel accommodating block 75.

In the above state, an annular space 73p is formed between the circumferential surface of the plunger 73h higher than the flange 73j and the large-diameter portion 73d of the passage 73c. A coil spring 73r is installed in this space 73p. The female screw 73g of the large-diameter portion 73d receives a male screw 73t of a cap 73s. With the cap 73s screwed into the passage 73c, the end surface of the male screw 73t presses the coil spring 73r toward the flange 73j side. Hence, the plunger 73h is urged by the coil spring 73r through the flange 73j to cause the lower end of the small-diameter portion 73k to close the valve 73b.

Figure 12:
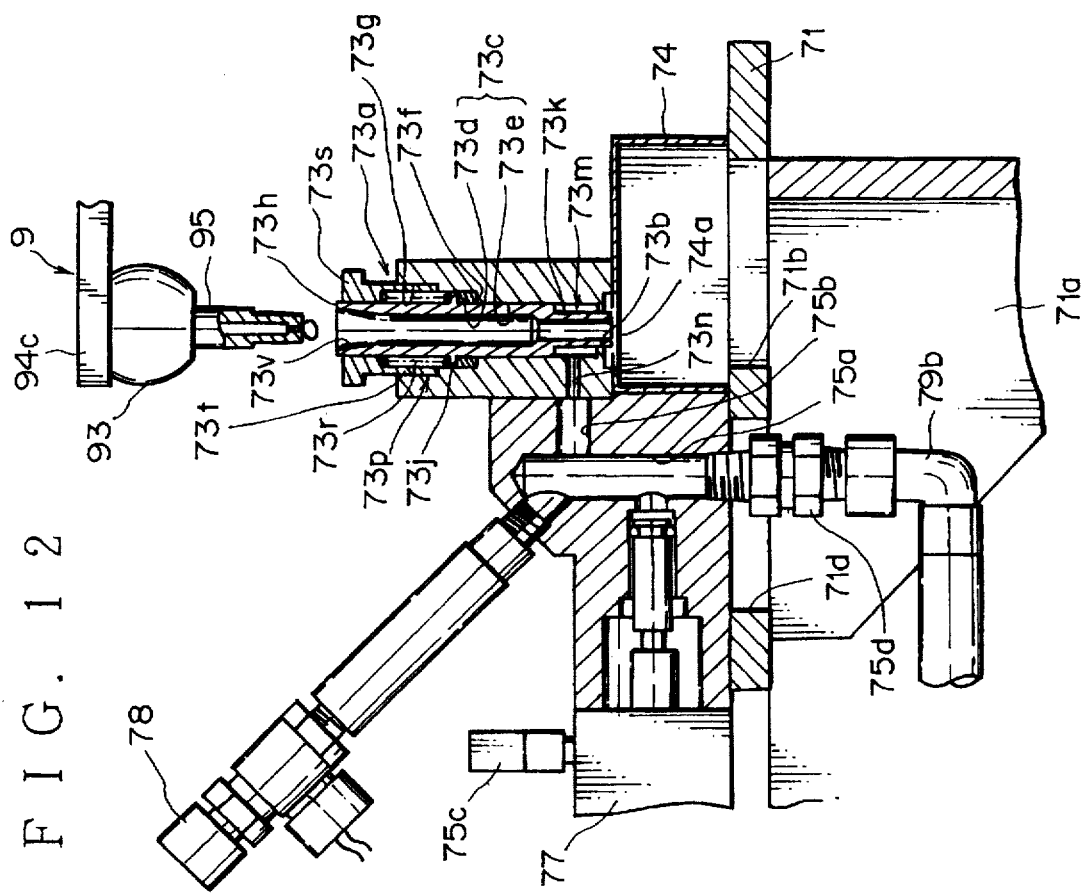
FIG. 12 is an enlarged side cross section of a nozzle block of FIG. 11.

In FIG. 12, reference number 73v represents a passage which pierces through the plunger 73h and has an inner diameter nearly equal to the large-diameter portion 53h having the largest of the inner diameters of several kinds of adapters 53g. Where they face the valves 73b, the base frame 74 and the base 71 have passage holes 74a, 71b, respectively, to allow the grain-like gelling agent dropping from the valve 73b to pass through the base 71 downwardly. There are prepared two or more kinds of plungers 73h with differing outer diameters of the small-diameter portion 73k. As in the case of the adapter 53g, a plunger 73h whose small-diameter portion 73k has the most appropriate size of the annular space 73m for the size and shape of the seeds transferred from the seed supply section 5 to the gel covering section 7 is selectively installed in each passage 73c so that an adequate amount of gelling agent for covering the seeds can be dropped.

The gel accommodating block 75, as shown in FIG. 10, is virtually a rectangle in plan view which is elongate in lateral direction, its lateral length corresponding to that of the nozzle block 73. In the gel accommodating block 75 are formed eight downwardly opening gel passages 75a that are arranged laterally at equal intervals corresponding to the passages 73c of the nozzle block 73, as shown in FIG. 12.

The upper end portion of each gel passage 75a communicates through the passage 75b with the rear side of the gel accommodating block 75 that faces the corresponding passage 73n in the nozzle block 73. Through the passages 75b and the passages 73n of the nozzle block 73, communication is established between the gel passages 75a and the spaces 73m of the corresponding passages 73c in the nozzle block 73.

The pressurizing air cylinders 77 are horizontally connected to the front side of the gel accommodating block 75 that faces the passages 75b. The interior of each pressurizing air cylinder 77 communicates with the corresponding gel passage 75a at a point below the passage 75b. In FIG. 12, reference numeral 75c indicates a speed controller to adjust the speed of the extension and contraction operation of the pressurizing air cylinder 77. At the lower ends of the gel passages 75a there are provided check valves 75d to prevent a backflow from the gel passages 75a toward the outside.

The air vent valves 78 are connected at an angle of about 45x to the sloped front upper part of the gel accommodating block 75 to which the pressurizing air cylinders 77 are connected. The interior of the air vent valves 78 communicates with the upper end 75f of the gel passage portion 75a.

The manifold 79, as shown in FIG. 11, is located below the pressurizing air cylinders 77 with a gap for the base 71 therebetween and is formed almost cylindrical. The ends of the manifold 79 are mounted to the underside of the lateral ends of the base 71 and are closed by a pair of brackets 71c extending forwardly from the base 71, as shown in FIG. 9. One end of the manifold 79 is connected with a free-coupling joint (referred to as a coupler) that passes through the bracket 71c. This coupler 79a is connected to the gelling agent tank (not shown) through a high-pressure hose and a pump (both not shown). The outer circumference of the rear part of the manifold 79 is connected with eight joints 79bf at their one end which are arranged at equal intervals in the lateral direction of the gel-covering apparatus 1. The other end of the joints 79b, as shown in FIG. 12, passes through the passages 71d of the base 71 and connects to the lower end of the corresponding gel passages 75a in the gel accommodating block 75.

The seed transfer section 9 is to transport seeds from the seed supply section 5 to the gel covering section 7 and includes, as shown in FIG. 3, a movable stage 91 supported movable on the auxiliary frame 33 so that it can be moved longitudinally of the gel-covering apparatus 1, a manifold 93 supported on the movable stage 91 so that it can be raised and lowered, eight suction tips 95 supported by the manifold 93, and a vacuum pump 97 fixedly mounted on the movable stage 91. The movable stage 91, as shown in FIG. 7, has a base plate 91a and a rodless magnet cylinder 91b for driving the base plate 91a.

The base plate 91a, as shown in FIG. 4, is virtually a rectangle in plan view which is laterally elongate spanning between the left and right sides of the auxiliary frame 33. As shown in FIG. 7, the base plate 91a is horizontally arranged over the auxiliary frame 33. As shown in FIG. 5, a slider 91c is mounted to the underside of the base plate 91a near the left side portion of the auxiliary frame 33. The underside of the slider 91c is formed with a downwardly opening guide groove 91d, as shown in FIG. 5, which fits over the guide rail 38 on the left sub-upper crosspiece 37. With the base plate 91a situated between the main upper crosspieces 36, as shown in FIG. 4, collared blocks 91e are mounted to the underside of the base plate 91a at locations facing the guide shafts 36b. The guide shafts 36b pass longitudinally through the collars of the corresponding blocks 91e.

The rodless magnet cylinder 91b, as shown in FIG. 4, extends between the support plates 36a of the main upper crosspieces 36 at nearly the center between the two guide shafts 36b. A cylinder barrel 91f of the rodless magnet cylinder 91b is arranged below the base plate 91a between the blocks 91e so that it will not interfere with the base plate 91a and the blocks 91e. The upper part of the cylinder barrel 91f is formed with a slit 91h over nearly the entire length of the cylinder barrel. In the cylinder barrel 91f is installed a piston yoke (not shown) that slides between the ends of the cylinder barrel 91f by the action of magnet.

A piston mount 91j that slides together with the piston yoke projects out of the slit 91h of the cylinder barrel 91f. A bracket 91k extending vertically downward from the underside of the base plate 91a between the blocks 91e is secured to the piston mount 91j by screws 91m.

The manifold 93 is formed cylindrical and slightly smaller in lateral width than the seed tank 53 as shown in FIG. 5, with its ends, almost circular in cross section, closed as shown in FIG. 7. The manifold 93 is supported by the base plate 91a through a raise-lower mechanism 94.

The raise-lower mechanism 94, as shown in FIG. 5, includes side plates 94a extending vertically downward from the underside of the base plate 91a on the laterally inner side of each slider 91c; a pair of raise-lower frames 94b arranged on the inner side of the side plates 94a; a retainer plate 94c located below the base plate 91a and having its lateral ends supported by the raise-lower frames 94b; and an air cylinder 94d to raise and lower the retainer plate 94c relative to the base plate 91a.

The side plates 94a each have a vertically extending guide rail 94e mounted on the inner side thereof and the raise-lower frames 94b each have a slider 94f secured to the outer side thereof. As shown in FIG. 4, each of the sliders 94f is formed at the outer side with an outwardly opening guide groove 94g, which fits over the guide rail 94e of the corresponding side plate 94a. The retainer plate 94c is formed larger in longitudinal length than the base plate 91a so that, with the rear end of the retainer plate 94c positioned at nearly the longitudinal center of the base plate 91a, the front end of the retainer plate 94c is situated in front of the base plate 91a. The air cylinder 94d is mounted on the upper surface of the base plate 91a at a point slightly near the front and on the left side of the block 91e. A cylinder rod of the air cylinder 94d passes through the base plate 91a as shown in FIG. 5 and is coupled to the upper surface of the retainer plate 94c near the rear end thereof through a joint rod 94h as shown in FIG. 4.

The manifold 93 is mounted to the front underside of the retainer plate 94c and has two joints 93a attached to the rear circumferential wall thereof at positions laterally spaced apart. The bottom circumferential wall of the manifold 93 is formed, as shown in FIG. 5, with eight holes 93b at laterally equal intervals corresponding to the through-holes 53f of the tank body portion 53b. The two joints 93a, as shown in FIG. 4, are connected through high-pressure hoses not shown to a forked joint 94j that is secured to the underside of the retainer plate 94c at a point behind the air cylinder 94d.

The suction tips 95, as shown in FIG. 5, are removably attached to respective holes 93b of the manifold 93 and are formed virtually cylindrical. The suction tips 95 each have formed in their center a suction passage (not shown) that communicates with the interior of the manifold 93. There are prepared several kinds of suction tips 95 with differing outer diameters and differing suction passage inner diameters. As in the case of the adapters 53g of the tank body portion 53b, according to the size and shape of the seeds transferred from the seed supply section 5 to the gel covering section 7, selection is made of the suction tips 95 whose outer diameter and the suction passage inner diameter are most suited for picking up and holding the seeds by suction and whose outer diameter can be inserted into the large-diameter portion 53h of the holes 58A of the adapters 53g. The selected suction tips 95 are then fitted in the holes 93b.

The rodless magnet cylinder 91b drives the manifold 93 longitudinally between a rear position and a front position by sliding its piston mount 91j forwardly and backwardly. With the air cylinder 94d of the raise-lower mechanism 94 contracted, the rear position is where the front end of each suction tip 95 is situated above the corresponding adapter 53g of the tank body portion 53b, and the front position is where the front end of each suction tip 95 is situated above the corresponding seed injection port 73a of the nozzle block 73.

At the rear position of the rodless magnet cylinder 91b, the air cylinder 94d of the raise-lower mechanism 94 extends its piston rod to position the front end of each suction tip 95 at a height immediately before contacting the step portion 58k of the corresponding adapter 53g, as indicated by an imaginary line of FIG. 8. At the front position of the rodless magnet cylinder 91b, the air cylinder 94d extends its piston rod to position the front end of each suction tip 95 so that it is inserted from the seed injection port 73a into the passage 73v of the plunger 73h fitted in the passage 73c.

During the extending action of the air cylinder 94d at the rear position of the rodless magnet cylinder 91b, there is a small gap between the adapter 53g and the suction tip 95, through which the interior of the tank body portion 53b communicates with the outside.

The vacuum pump 97, as shown in FIG. 5, is mounted through a seat 97a on the upper surface of the base plate 91a at a location corresponding to the blocks 91e. The vacuum pump 97 has a silencer 97b at its top. On the left side of the vacuum pump 97 on the base plate 91a there is mounted an air filter 99 through a manifold 98. The vacuum pump 97 is connected to the air filter 99 through a high-pressure hose not shown. The air filter 99 is connected, through a high-pressure hose not shown and the manifold 98, to a pressure sensor 97c which is mounted on the base plate 91a on the back side of the manifold 98, as shown in FIG. 4. The manifold 98 is further connected to the two joints 93a of the manifold 93 through high-pressure hose not shown and the forked joint 94j.

The gel hardening section 11 is to make the gelling agent adhering to the grainlike seeds that were processed by the gel covering section 7 react with the hardener to harden the gelling agent and thereby forming the gel-covered seeds. As shown in FIG. 3, the gel hardening section 11 comprises a hardening tank 111, a gel guide mechanism 113 and a hardening agent supply mechanism 115.

Figure 13:
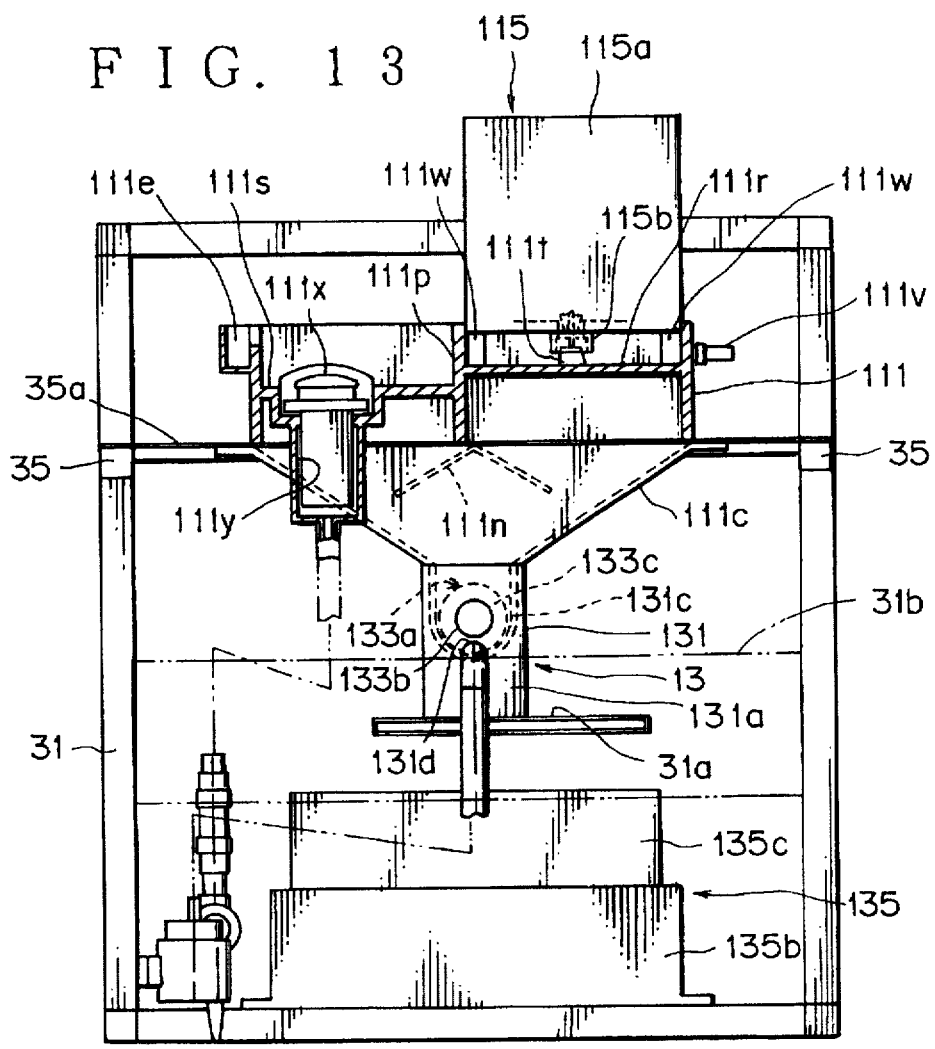
FIG. 13 is a partly cutaway, enlarged front view of a gel hardening section and a gel cleaning section shown in FIG. 1.
Figure 14:
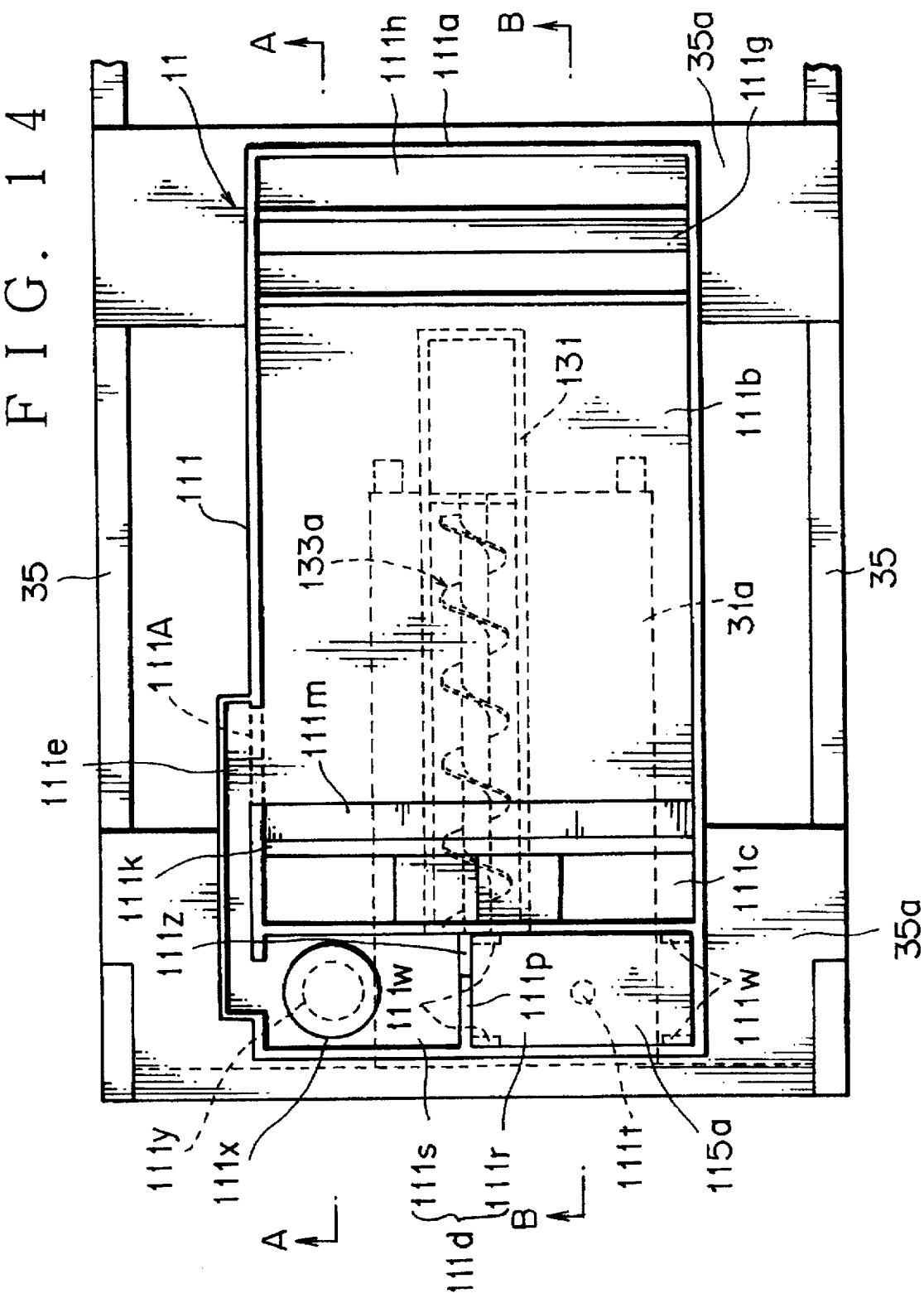
FIG. 14 is an enlarged plan view of the gel hardening section shown in FIG. 1.

FIG. 13 is a partly cutaway enlarged front view of the gel hardening section and the gel cleaning section; FIG. 14 is an enlarged plan view of the gel hardening section; FIG. 15 is a cross section taken along the line A—A of FIG. 14; and FIG. 16 is a cross section taken along the line B—B of FIG. 14. The hardening tank 111, as shown in FIG. 14, is virtually a rectangle in plan view which is elongate in the longitudinal direction of the gel-covering apparatus 1 and is slightly wider in the lateral direction of the gel-covering apparatus 1 than the nozzle block 73 of the gel covering section 7. As shown in FIG. 14, the front and rear ends of the hardening tank 111 are supported on two longitudinally spaced thin plates 35a that span between the left and right sides of the lateral reinforcement frame 35 of the main frame 31.

The hardening tank 111 has a feed liquid tank 111a, a reaction tank 111b, a seed dropping port 111c, a waste liquid tank 111d, and a detour liquid passage 111e.

The feed liquid tank 111a, as shown in FIG. 14, is formed in the hardening tank 111 at the rear end of the gel-covering apparatus 1. Adjacent to the feed liquid tank 111a on its front side is formed the reaction tank 111b whose bottom is higher than the bottom of the feed liquid tank 111a, as shown in FIG. 15. At the longitudinally central part of the bottom of the feed liquid tank 111a a flow regulating barrage 111g is erected, as shown in FIG. 14, which is higher than the bottom of the reaction tank 111b and lower than the upper end of the feed liquid tank 111a and which spans laterally over the entire width of the hardening tank 111. The flow regulating barrage 111g has a hole longitudinally extending through the base thereof.

A first half of the feed liquid tank 111a on the front side of the flow regulating barrage 111g, i.e., on the side adjacent to the reaction tank 111b, is located below the eight valves 73b formed in the nozzle block 73 of the gel covering section 7. A second half of the feed liquid tank 111a on the rear side of the flow regulating barrage 111g has a feed liquid port 111h formed in its bottom, as shown in FIG. 16. A barrier plate 111j, which is made of a thin plastic plate smaller in width than the hardening tank 111 and curved convex upwardly, is accommodated in the rear half of the feed liquid tank 111a behind the flow regulating barrage 111g so that it encloses the feed liquid port 111h.

At the front end bottom of the reaction tank 111b a water stopping barrage 111k is formed, as shown in FIG. 15. The water stopping barrage 111k is shaped like a mountain peak when the gel-covering apparatus 1 is viewed from the side, and has a height higher than the flow regulating barrage 111g and lower than the upper end of the feed liquid tank 111a.

The water stopping barrage 111k has its rear inclined surface 111m formed of an upwardly concave arc surface.

The seed dropping port 111c is arranged in front of the water stopping barrage 111k and, as shown in FIG. 13, is formed like a funnel whose lateral width progressively decreases from the top toward the bottom. This seed dropping port 111c forms a passage that opens to a space above the hardening tank 111 and to a space below a part of the hardening tank 111 behind that thin plate 35a which supports the front end side of the hardening tank 111. In the seed dropping port 111c there is installed a mountain-like barrier plate 111n whose lateral width increases downwardly from the top.

The waste liquid tank 111d is provided adjacent to the seed dropping port 111c on the front side and, as shown in FIG. 14, is divided by a laterally central partition wall 111p into two a tank holder 111r on the right-hand side of the hardening tank 111 and a cleaning portion 111s on the left-hand side.

The tank holder 111r has its bottom higher than the bottom of the feed liquid tank 111a and lower than the bottom of the reaction tank 111b, as shown in FIG. 16. At the central part of the bottom of the tank holder 111r is erected a virtually cylindrical engagement projection 111t which is slightly lower than the upper end of the water stopping barrage 111k, as shown in FIG. 13 and 14. The side wall of the tank holder 111r is provided with an open-close valve 111v for draining water, as shown in FIG. 13. At four corners of the tank holder 111r, there are installed spacers 111w, as shown in FIG. 14, whose top end is almost equal in height to the top end of the water stopping barrage 111k as shown in FIG. 16.

The bottom of the cleaning portion 111s is higher than the bottom of the feed liquid tank 111a and slightly lower than the bottom of the tank holder 111r, as shown in FIG. 13. At the bottom of the cleaning portion 111s near the side wall a filter 111x is installed to remove seed grounds in the hardening agent. Below the filter 111x is formed a waste liquid port 111y. The rear part of the partition wall 111p near the seed dropping port 111c is formed with a notch 111z that communicates the tank holder 111r with the cleaning portion 111s, as shown in FIG. 14.

The detour liquid passage 111e connects the side wall area of the reaction tank 111b behind the water stopping barrage 111k on the side of the feed liquid tank 111a to the side wall area of the waste liquid tank 111d. The detour liquid passage 111e projects from the side of the hardening tank 111. The side wall portion of the reaction tank 111b to which the detour liquid passage 111e is connected is covered with comb teeth 111A, as shown in FIG. 15, which restrict the ingress of grainlike seed-enclosing gelling agent which falls from the valves 73b of the gel covering section 7.

The feed liquid port 111h of the feed liquid tank 111a and the waste liquid port 111y of the cleaning portion 111s are connected via a hose 117 and a magnet pump 119. The hose 117 upstream of the magnet pump 119 (on the waste liquid port 111y side) is connected with the hardening agent tank not shown through a passage changeover valve (not shown).

When the magnet pump 119 is activated with the changeover valve switched to the hardening agent tank side, the hardening agent in the hardening agent tank is supplied through the hose 117 and the feed liquid port 111h into the feed liquid tank 111a, from which the hardening agent is further supplied to the reaction tank 111b, the detour liquid passage 111e, and the tank holder 111r, partition wall 111p and cleaning portion 111s of the waste liquid tank 111d. As a result, the entire hardening tank 111 is filled with the hardening agent whose level is between the upper and lower ends of the water stopping barrage 111k. The hardening agent discharged from the waste liquid port 111y of the cleaning portion 111s is returned to the feed liquid tank 111a through the hose 117 and the feed liquid port 111h by activating the magnet pump 119 with the changeover valve switched to the waste liquid port 111y side.

As can be seen from the above explanation, in this embodiment a circulation passage 111B to return the liquid hardener from the waste liquid tank 111d to the feed liquid tank 111a is formed by the detour liquid passage 111e, tank holder 111r, partition wall 111p, cleaning portion 111s, hose 117 and feed liquid tank 111a.

The gel guide mechanism 113 has a belt conveyor 113a, guide paddles 118b circulated by the belt conveyor 113a, a motor 113c for driving the belt conveyor 113a, and a power transmission 118d for transmitting the rotation of the motor 113c to the belt conveyor 113a.

The belt conveyor 113a is constructed of a belt 113f wound around two pulleys 113e, as shown in FIG. 16. The pulleys 113e are installed above the front half of the feed liquid tank 111a on the reaction tank 111b side of the flow regulating barrage 111g, i.e., that portion of the feed liquid tank 111a into which the gelling agent is dropped from the valves 78b of the gel covering section 7, and also above a portion of the reaction tank 111b on the feed liquid tank 111a side of the water stopping barrage 111k, with their shafts directed laterally horizontally. The ends of the pulleys 113e, as shown in FIG. 2 and 3, are rotatably supported by front and rear end portions of two support plates 31f that extend longitudinally of the gel-covering apparatus 1. The front and rear ends of the two support plates 31f are supported on the underside of two base plates 31e at locations inside the main frame 31, the two base plates 31e spanning between the left and right sides of the main frame 31 at a longitudinally central portion and at a position slightly in front of the central portion. As shown in FIG. 1, the belt 113f spans laterally over the entire width of the hardening tank 111.

The guide paddles 113b, as shown in FIG. 16, are erected on the surface of the belt 113f at equal intervals in the longitudinal direction of the belt. As shown in FIG. 1, the guide paddles 113b are virtually rectangles in plan view which have a width corresponding to the belt 113f and a height sufficiently smaller than the width. The guide paddles 113b are, as shown in FIG. 1, formed with a number of vertical slits at laterally equal intervals extending over the entire height of the paddle.

As shown in FIG. 16, the guide paddles 113b protrude to a length such that the front ends of the guide paddles 113b on that part of the belt 113f facing the bottom of the reaction tank 111b are disposed close to the side walls and bottom of the reaction tank 111b with a small gap therebetween and that the front ends of the guide paddles 113b on that part of the belt 113f moving around the circumferential surface of the pulley 113e located above the front part of the reaction tank 111b follow the inclined surface 111m of the water stopping barrage 111k with a small gap between the paddle front ends and the inclined surface.

The motor 113c (corresponding to a circulation driving source), as shown in FIG. 2, is supported on a base plate 35c spanning between the two support plates 31f situated virtually longitudinally intermediate between the two base plates 31e. The power transmission 113d includes a reduction gear mechanism 113h connected to the output shaft of the motor 113c supported on the base plate 35c, and a belt pulley mechanism 113j wound around the output shaft of the reduction gear mechanism 113h and the shaft of the pulley 113e mounted on the front part of the gel-covering apparatus 1. The belt conveyor 113a is circulated by the action of the motor 113c and power transmission 113d in such a direction that the belt 113f portion facing the hardening agent in the hardening tank 111 moves from the feed liquid tank 111a toward the waste liquid tank 111d.

The hardening agent supply mechanism 115, as shown in FIG. 13, has a reserve tank 115a and a cap 115b. The reserve tank 115a stores the highly dense hardening agent for adjusting the density of the hardening agent in the hardening tank 111. The reserve tank 115a is shaped into a vertically elongate rectangle in front view, as shown in FIG. 13. When seen in plan view, it is sized so that it can be accommodated in the tank holder 111r, as shown in FIG. 14. At the central part of the bottom of the reserve tank 115a, a tank port 115c is formed, as shown in FIG. 16, to communicate the interior with the exterior.

Figure 17:
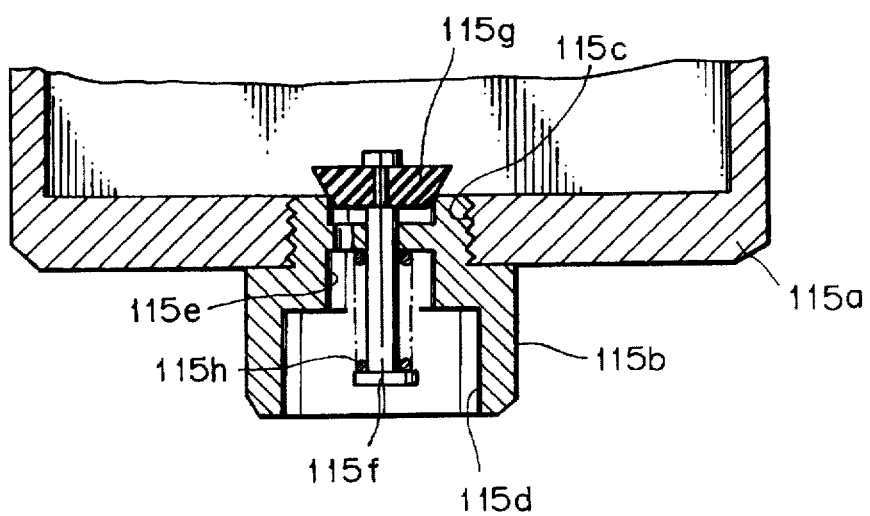
FIG. 17 is an enlarged side cross section of a cap shown in FIG. 13.

The cap 115b is screwed into the tank port 115c to close it. As shown in the enlarged side cross section of FIG. 17, it has a recess 115d that is exposed when the cap 115b is screwed into the tank port 115c. A small-diameter slide pin 115f is inserted into the central part of the bottom of the recess 115d. At a periphery of the bottom of the recess 115d through which the slide pin 115f is inserted, a through-hole 115e for communicating the inside and the outside of the cap 115b is formed.

One end of the slide pin 115f extends out into the recess 115d, with the other end situated inside the cap 115b. The inner end of the slide pin 115f is attached with a rubber plug 115g that closes the through-hole 115e. A coil spring 115h sleeved over the slide pin 115f between a flange of the slide pin 115f at the outer end and the peripheral part of the bottom of the recess 115d through which the slide pin 115f is inserted urges the slide pin 115f toward the outside of the cap 115b to close the through-hole 115e with the rubber plug 115g.

The reserve tank 115a is so constructed that when the cap 115b is screwed into the tank port 115c and the reserve tank 115a is put in the tank holder 111r with the cap 115b side down, the bottom of the recess 115d of the cap 115b is situated slightly lower than the upper end of the water stopping barrage 111k.

The gel cleaning section 13 is to wash the gel-covered seeds whose gelling agent has hardened after reacting with the hardening agent in the gel hardening section 11. As shown in FIG. 3, it includes a water cleaning tank 131, a gel guide mechanism 133, and a gel discharge mechanism 135.

Figure 18:
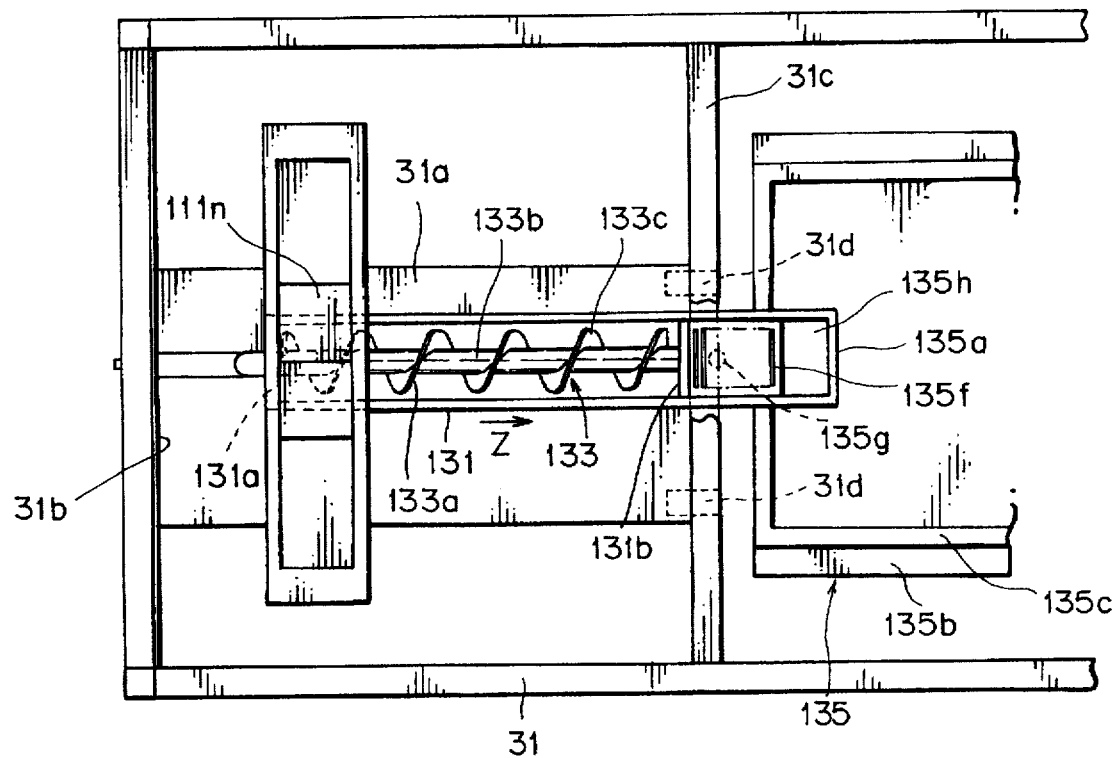
FIG. 18 is an enlarged plan view of a gel cleaning section of FIG. 1.

The water cleaning tank 131 extends from the seed dropping port 111c to the longitudinally central part of the reaction tank 111b, as shown in FIG. 16. Supported on a support plate 31a, the water cleaning tank 131 is located below the hardening tank 111 at a laterally central part of the main frame 31, as shown in FIG. 13. The support plate 31a is mounted at one end to a thin plate 31b which is horizontally disposed between left and right front portions of the main frame 31 below the lateral reinforcement frame 35. The other end of the support plate 31a is mounted at its left and right side to the lower ends of two thin plates 31d that are suspended from laterally spaced portions of a reinforcement frame 31c spanning between the left and right upper portions of the main frame 31, as shown in FIG. 16 and in FIG. 18 representing the enlarged plan view of the gel cleaning section.

Figure 19:
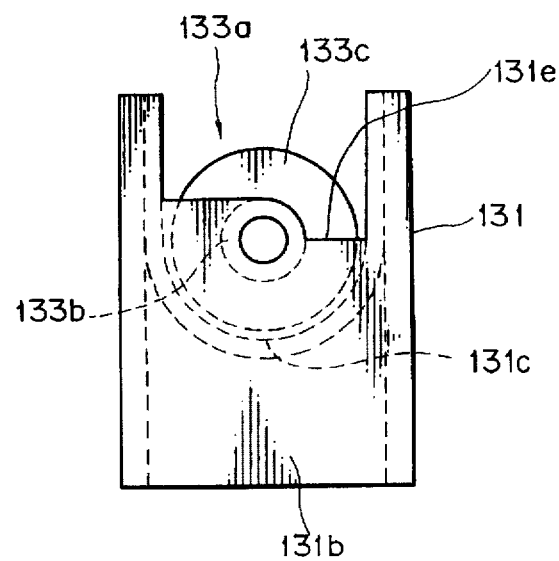
FIG. 19 is an enlarged rear view of a rear plate of a cleaning tank shown in FIG. 18.

The water cleaning tank 131 has a vertically open outer frame, which is virtually rectangular in plan view, and also a body plate 131c which is accommodated in the outer frame and extends from a front plate 131a to a rear plate 131b. The water cleaning tank 131 stores cleaning water for cleaning the gel-covered seeds after the gelling agent adhering to the seeds are hardened. The front plate 131a, as shown in FIG. 13, is a vertically elongate rectangle in front view and, at a vertically central part, is formed with a water supply port 131d that communicates with the interior of the water cleaning tank 131. The rear plate 131b, as shown in the enlarged rear view of FIG. 19, has a roughly reverse L-shaped notch 131e in the upper half thereof. The body plate 131c, when seen from the front, is shaped like a letter U and upwardly open with the lower part bent in semicircle. Between the outer surface of the body plate 131c and the support plate 31a there are installed reinforcement plates 131f at longitudinally spaced locations, as shown in FIG. 16. Denoted 131g in FIG. 16 is a plug for draining the cleaning water which is attached to a bottom of the body plate 131c near the front plate 131a.

The gel guide mechanism 133 has a screw feeder 133a and a motor (not shown) for driving the screw feeder 133a. The screw feeder 133a, as shown in FIG. 18, has a shaft 133b and a spiral blade 133c. The shaft 133b extends along the center of the curvature of the lower part of the body plate 131c and its ends are rotatably supported by the front plate 131a and the rear plate 131b. The spiral blade 133c is secured to the outer circumference of the shaft 133b between the front plate 131a and the rear plate 131b. The motor not shown is connected to the shaft 133b through a gear 133d which is secured to that part of the shaft 133b passing through the front plate 131a and extending forwardly from the water cleaning tank 131 and through a reduction gear train not shown in mesh with the gear 133d. The screw feeder 133a rotates in a direction that will move the gel-covered seeds in the cleaning water in the water cleaning tank 131 from the front plate 131a toward the rear plate 131b by the action of the motor, reduction gear train and gear 133d.

The gel discharge mechanism 135 has a water separating box 135a, a water discharge pan 135b, and a seed receiving cage 135c. The water separating box 135a is formed adjacent to and on the back side of the rear plate 131b and is virtually a rectangle in plan view having a predetermined length in the longitudinal direction. The water separating box 135a is open upward and, as shown in FIG. 18, has a lateral width corresponding to that of the water cleaning tank 131.

At a longitudinally central part of the bottom of the water separating box 135a is erected an engagement wall 135d, as shown in FIG. 16. Between the upper end of the engagement wall 135d and the lower end of the notch 131e of the rear surface of the rear plate 131b there is installed a water separating plate 135e which inclines downwardly from the rear plate 131b toward the engagement wall 135d. The lower end of the water separating plate 135e is locked to a corner of the engagement wall 135d on the rear plate 131b side.

Between the upper end of the engagement wall 135d and the rear plate 131b the water separating plate 135e is as wide in the lateral direction as the water separating box 135a and is formed with a number of laterally elongate slits 135f that are longitudinally spaced from one another. These slits 135f prevent the passage of the gel-covered seeds from the water cleaning tank 131 while at the same time allowing the water to pass through.

In the bottom of the water separating box 135a on the rear plate 131b side of the engagement wall 135d, a water discharge port 135g is formed, as shown in FIG. 16, to discharge water that has passed through the slits 135f of the water separating plate 135e. The bottom of the water separating box 135a on the rear side of the engagement wall 135d, i.e., on the side opposite the water discharge port 135g, is formed with a seed discharge port 135h that can be opened and closed.

The water discharge pan 135b is shaped like a flat rectangular dish that opens upward. The water discharge pan 135b extends longitudinally from below the water separating box 135a to the rear end of the main frame 31 and has a lateral width smaller than the main frame 31. The front and rear ends of the water discharge pan 135b are supported on the left and right lower portions of the main frame 31 at the rear end and longitudinally central part of the main frame 31. The bottom of the water discharge pan 135b is formed with a water discharge port (not shown), which communicates to a discharge valve 135j installed at the right-hand side of the water discharge pan 135b. The seed receiving cage 135c is virtually rectangular in plan view and open upwardly and is formed of a mesh that prevents passage of the gel-covered seeds. The seed receiving cage 135c is so shaped and sized that it can be installed inside the water discharge pan 135b.

Next, the operation of the gel-covering apparatus 1 of this embodiment with the above construction will be explained.

In starting the process of covering seeds with gel, one of the several kinds of adapters 53g whose inner diameter of the small-diameter portion 53j is most suited to the kind or size of the seeds to be processed is selected and mounted to the eight through-holes 53f of the tank body portion 53b in the seed tank 53.

Among the several kinds of plungers 73h, one is selected whose outer diameter of the small-diameter portion 73k is most suited to the size of the seeds to be processed. The selected plunger is installed in the eight passages 73c of the nozzle block 73 in the gel covering section 7 and the coil spring 73r is fitted in each of the passages 73c, into which the caps 73s are then screwed. Further, from several kinds of suction tips 95, one is selected whose outer diameter and the suction passage inner diameter are most suited to the size of the seeds to be processed and which can be inserted into the large-diameter portion 53h of the hole 53A of the adapter 53g. The selected suction tip 95 is installed in each of the eight holes 93b of the manifold 93 in the seed transfer section 9.

Next, the power switch, not shown, of the gel-covering apparatus 1 is turned on to contract the pressurizing air cylinders 77 of the gel accommodating block 75. The air cylinder 94d of the raise-lower mechanism 94 is also contracted to raise the retainer plate 94c to the base plate 91a side. At the same time, the rodless magnet cylinder 91b is operated to slide the piston mount 91j backward to move the manifold 93 to the rear position.

Further, the turn-on of the power switch activates the vacuum pump 97 to start drawing air from the suction passages of the suction tips 95 through the manifold joints 93a, 94j and high-pressure hose not shown. At this time, because air is drawn from the suction tips 95 through the manifold 93 installed between the vacuum pump 97 and the suction tips 95, the suction pressures produced at the suction tips 95 are equal.

With the changeover valve switched to the hardening agent tank side, turning on the power switch causes the magnet pump 119 to supply the hardening agent from the hardening agent tank to the hardening tank 111. At this time, the hardening agent that have entered through the feed liquid port 111h into the rear half of the feed liquid tank 111a flows over the flow regulating barrage 111g or through the opening at the base of the barrage into the front half of the feed liquid tank 111a and further into the reaction tank 111b, thus filling the entire hardening tank 111.

The magnet pump 119 is temporarily stopped when the amount of hardening agent from the hardening agent tank reaches a certain volume such that the liquid level in the hardening tank 111 becomes equal to a predetermined level between the upper and lower end of the water stopping barrage 111k. After the changeover valve is switched to the waste liquid port 111y side, the magnet pump 119 is restarted. Hence, after the predetermined amount of hardening agent is supplied from the hardening agent tank to the hardening tank 111, the hardening agent discharged from the waste liquid port 111y of the cleaning portion 111s is returned through the hose 117 and the feed liquid port 111h into the feed liquid tank 111a.

When the hardening agent supplied from the hardening agent tank fills the whole hardening tank 111 or when the hardening agent is returned from the waste liquid port 111y of the cleaning portion 111s through the hose 117 and feed liquid port 111h into the feed liquid tank 111a, the hardening agent flows over or under the flow regulating barrage 111g into the reaction tank 111b, creating a flow of hardening agent in the hardening tank 111 that runs from the feed liquid tank 111a to the reaction tank 111b and the detour liquid passage 111e to the tank holder 111r and cleaning portion 111s of the waste liquid tank 111d.

Next, after the predetermined amount of hardening agent supplied from the hardening agent tank raises the liquid level of the hardening tank 111 to a predetermined level between the upper and lower ends of the water stopping barrage 111k, the reserve tank 115a is placed into the tank holder 111r with the cap 115b facing down. As a result, the engagement projection 111t of the tank holder 111r is inserted into the recess 115d of the cap 115b and its front end engages the slide pin 115f pushing the slide pin 115f into the cap 115b against the force of the coil spring, which in turn causes the rubber plug 115g to part from the through-hole 115e of the cap 115b, forming a gap between the through-hole 115e and the circumferential surface of the slide pin 115f.

At this time, because the position of the through-hole 115e of the cap 115b opened by the parting rubber plug 115g is slightly higher than the front end of the slide pin 115f pushed in by the engagement projection 111t and because the level of the hardening agent in the hardening tank 111 has reached the predetermined level between the upper and lower end of the water stopping barrage 111k, the high-density hardening agent in the reserve tank 115a will not flow out to the hardening tank 111 with the current liquid level of the hardening agent.

Next, the motor 113c of the gel guide mechanism 113 in the gel hardening section 11 is turned on to start circulating the belt conveyor 113a along the flow of the hardening agent in the hardening tank 111. A motor not shown in the gel cleaning section 13 is operated to rotate the screw feeder 133a to cause the cleaning water in the water cleaning tank 131 to flow from the front plate 131a side toward the rear plate 131b side and to slightly overflow the notch 131e of the rear plate 131b. As a result, in the water cleaning tank 131 the gel-covered seeds are transported from the front plate 131a side toward the rear plate 131b side. The cleaning water that has overflowed from the notch 131e of the rear plate 131b enters into the water separating box 135a where it passes through the slits 135f into the water discharge port 135g, from which it is discharged out of the water cleaning tank 131. The cleaning water is further returned through the water supply port 131d into the water cleaning tank 131.

Further, when the power is turned on, a compressor not shown applies a positive pressure to the gelling agent tank to deliver the gelling agent from the gelling agent tank through the high-pressure hose, pump and rubber tube joint 79a to the manifold 79 to fill the manifold 79 with the gelling agent. The gelling agent filled in the manifold 79 is further moved under pressure to the eight joints 79b and, from the lower end side, to the corresponding gel passages 75a of the gel accommodating block 75. Because the manifold 79 is interposed between the gelling agent tank and the gel accommodating block 75 and because the gelling agent is supplied to the respective gel passages 75a of the gel accommodating block 75 through this manifold 79, the gelling agent supply pressures for the gel passages 75a are equal, assuring the supply of the constant, same amount of gelling agent to each gel passage 75a according to their capacity.

When the gelling agent is supplied to the gel passages 75a, the air vent valves 78 are opened to vent air from the upper part of the gel passages 75a into which the gelling agent was supplied from the lower end side to ensure that the gelling agent fills the gel passages 75a without a gap. From the gel passages 75a, the gelling agent is further supplied under pressure through the passages 75b and the passages 73n into the corresponding spaces 73m of the passages 73c in the nozzle block 73 until the spaces 73m are filled with the gelling agent without a gap, at which time the air vent valves 78 are closed. When the gelling agent is supplied to the gel passages 75a, the backflow of the gelling agent from the gel passages 75a to the manifold 79 side is prevented by the check valves 75d at the lower ends of the gel passages 75a.

Under this condition, the pressurizing air cylinders 77 are extended to pressurize the gel passages 75a to increase the pressure in the spaces 73m through the passages 75b, 73n filled with the gelling agent. This causes the plungers 73h to move up the passages 73c against the force of the coil springs 73r, opening the valves 73b that were closed by the lower ends of the small-diameter portions 73k, with the result that the predetermined amounts of the gelling agent filled in the spaces 73m are pushed out of the valves 73b and fall from the nozzle block 73 in the form of grainlike drops.

When the pressurizing air cylinders 77 are contracted at the same time that the drops of gelling agent fall from the valves 73b, the pressures in the spaces 73m decrease, accelerated by the reduction in the amount of the gelling agent in the spaces 73m caused by the dropping gelling agent from the valves 73b, until the force of the coil springs 73r overcomes the pressure in the spaces 73m causing the plungers 73h to move down the passages 73c to close the valves 73b with the lower ends of the small-diameter portions 73k. As the valves 73b close, the gelling agent adhering to the valves 73b and the lower ends of the small-diameter portions 73k forms a film at the lower ends of the small-diameter portions 73k. To the extent that the gelling agent decreases in volume because of the dropping gelling agent from the valves 73b, the gel passages 75a are replenished with the gelling agent from the gelling agent tank through the manifold 79.

Next, the seeds to be processed are thrown into the hopper portion 53c of the seed tank 53 in the seed supply section 5. The seeds thrown in roll and slide down an inclined portion of the rear plate 53v and enter through the slit 53e into the tank body portion 53b.

The amount of seeds that pass through the slit 53e is limited to a specified amount determined by the vertical height H1 of the slit 53e and thus the amount of seeds in the tank body portion 53b is kept almost constant regardless of the amount of seeds thrown into the hopper portion 53c. The limitation of the amount of seeds supplied from the hopper portion 53c into the tank body portion 53b also involves, to some extent, the distance H3 from the bottom circumferential surface of the tank body portion 53b to the air chamber 53m.

After the seeds are accommodated into the tank body portion 53b, the air compressor not shown is operated to supply compressed air through the manifold 53r to the air chamber 53m, from which the compressed air blows out through the blowout ports 53n, creating an air flow in the tank body portion 53b circulating from the bottom of the tank body portion 53b to the front end to the top to the rear end, thus agitating the seeds in the tank body portion 53b.

In this embodiment, because the manifold 53r is disposed between the air compressor and the air chamber 53m and the compressed air s supplied to the blowout ports 53n through this manifold 53r, the blowout pressures of the compressed air at the blowout ports 53n are equal. Further, in this embodiment, the amount of seeds agitated in the tank body portion 53b is determined by the amount of seeds that pass between the air chamber 53m and the bottom inner circumferential surface of the tank body portion 53b and which are further carried from the bottom of the tank body portion 53b toward the front end by the air flow circulating from the bottom of the tank body portion 53b to the front end to the top to the rear end. In other words, the amount of seeds agitated is determined by the vertical distance between the air chamber 53m and the bottom inner circumferential surface of the tank body portion 53b.

Then, with the manifold 93 left at the rear position, the air cylinder 94d of the raise-lower mechanism 94 is extended to lower the retainer plate 94c away from the base plate 91a to position the front end of each suction tip 95 at a height just short of contacting the step portion 53k of the corresponding adapter 53g. As the seeds being agitated in the tank body portion 53b come near the through-holes 53f, they are picked up and held by the through-holes 53f by suction.

After a specified length of time elapses from the extension of the air cylinder 94d, the pressure sensor 97c measures the air pressure in the manifold 98. When the air pressure is found to exceed the predetermined pressure, it is decided that the suction pressure of at least a part of the suction tips 95 has not yet lowered to the suction pressure for holding the seeds and that not all the suction tips 95 are holding the seeds. Based on this decision, air evacuation by the vacuum pump 97 is stopped and the air cylinder 94d is contracted to raise the retainer plate 94c toward the base plate 91a to the original position. After the air cylinder 94d is contracted, the vacuum pump 97 is restarted.

Then, when the air pressure in the manifold 98 measured by the pressure sensor 97c is found to be lower than the predetermined pressure, the vacuum pump 97 is not stopped and, with all the suction tips 95 holding the seeds by suction, the air cylinder 94d is contracted to raise the retainer plate 94c toward the base plate 91a.

While the suction tips 95 hold the seeds by suction, the interior and the exterior of the tank body portion 53b communicate with each other through a small clearance between the front end of each suction tips 95 and the adapter 53g, so that a part of the air flow created in the tank body portion 53b by the compressed air blowing out of the blowout ports 53n escapes out of the tank body portion 53b through the small clearance between the front end of each suction tips 95 and the hole 53A of the adapter 53g. Hence, a part of the seeds being agitated in the tank body portion 53b is carried by the escaping part air flow to near the hole 53A of the adapter 53g.

Further, while the suction tips 95 hold the seeds by suction, the air flow created by the blowing compressed air from the blowout ports 53n circulates not only the seeds but also dust such as seed grounds produced when the seeds contact the inner wall of the tank body portion 53b and dust entering the tank body portion 53b through the adapters 53g in the tank body portion 53b, raising the possibility of such dust being sucked into the suction tips 95. However, the air filter 99 installed adjacent to the vacuum pump 97 removes the dust drawn into the suction tips 95 and thereby cleans air, thus preventing the clogging of the suction tips 95 and overheating of the vacuum pump 97 due to overload.

In replacing the adapters 53g in the seed supply section 5 or maintaining the seed tank 53, the user need only to hold the grip 51d and move the slide plate 51c along the guide grooves 51b of the guide rails 51a to pull the seed tank 53 to the right and take it out of the main frame 31. This allows the maintenance to be performed without being interfered with by the seed transfer section 9 at the upper part of the seed supply section 5.

Then, with the suction tips 95 holding the seeds by suction, the air cylinder 94d is contracted to raise the retainer plate 94c toward the base plate 91a, followed by the rodless magnet cylinder 91b being operated to slide the piston mount 91j forwardly to move the manifold 93 to the front position. Next, the air cylinder 94d is extended to lower the retainer plate 94c away from the base plate 91a to position the front end of each suction tip 95 so that it is inserted from the seed injection port 73a of the corresponding nozzle block 73 into the passage 73v of the plunger 73h in the passage 73c. After this, the drawing of air by the vacuum pump 97 is stopped to deactivate the suction tips 95 that are holding seeds by suction and a positive pressure is applied to the suction tips 95 to drop the seeds from the suction tips 95 into the passages 73v of the plungers 73h.

The operation of the vacuum pump 97 is stopped to drop the seeds that were held by the suction tips 95 into the passages 73v of the plungers 73h. After this, the air cylinder 94d is contracted to raise the retainer plate 94c toward the base plate 91a. Then the rodless magnet cylinder 91b is operated to slide the piston mount 91j rearward to return the manifold 93 to the original rear position.

As can be seen from the above description, the direction in plan view in which the seed transfer section 9 transfers the seeds from the seed supply section 5 to the gel covering section 7, i.e., the horizontal component of the transfer direction, is indicated by the arrow X in FIG. 4 and 7.

As described above, when the seeds held by the suction tips 95 are dropped into the plungers 73h, the seeds rest on the film of gelling agent formed at the lower ends of the small-diameter portions 73k of the plungers 73h. In synchronism with this process, the pressurizing air cylinders 77 are extended to increase the pressure in the spaces 73m through the gel passages 75a and passages 75b, 73n, causing the plungers 73h to move up, opening the valves 73b. As a result, a predetermined amount of the gelling agent in the spaces 73m is pushed down out of the nozzle block 73 through the valves 73b by the internal pressure of the spaces 73m, contacting the gelling agent films formed at the lower ends of the small-diameter portions 73k on which the seeds are resting. The seeds are thus enclosed by the gelling agent and then fall as grainlike covered seeds through the holes 74a, 71d of the base frame 74 and base 71 into the hardening tank 111 below the base 71.

At this time, the backflow of the gelling agent from the gel accommodating block 75 to the manifold 79 side is prevented by the check valves 75d.

Then, the pressurizing air cylinders 77 are contracted to lower the plungers 73h closing the valves 73b and forming the gelling agent films at the lower ends of the small-diameter portions 73k. At the same time, the gelling agent of an amount corresponding to that which was pushed out of the valves 73b to cover the seeds is supplied under pressure from the gelling agent tank through the manifold 79 to the gel passages 75a.

The above-mentioned operation of the seed supply section 5, gel covering section 7 and seed transfer section 9 is performed by controlling a sequencer not shown. By repeating this sequence of operation, eight grainlike covered seeds enclosed by gelling agent are produced simultaneously in one process. The eight covered seeds are dropped into the front half of the feed liquid tank 111a on the reaction tank 111b side of the flow regulating barrage 111g in the hardening tank disposed below the base 71 and enter into the hardening agent.

When the covered seeds fall into the front half of the feed liquid tank 111a of the hardening tank 111 on the reaction tank 111b side of the flow regulating barrage 111g and enter into the hardening agent, they are carried by the flow in the hardening tank 111 and transferred through the hardening agent to the reaction tank 111b, where they are moved slightly forward before being pushed toward the water stopping barrage 111k by the guide paddles 113b immersed in the hardening agent as the belt conveyor 113a is circulated.

During this time, the hardening agent in the reaction tank 111b escapes through the slits 113g or through small clearances between the guide paddles 113b and the side wall and bottom surface of the reaction tank 111b into the feed liquid tank 111a side of the guide paddles 113b as the immersed guide paddles 113b are driven. Hence, the movement of the guide paddles 113b through the hardening agent neither disturbs the flow of the hardening agent greatly nor causes the hardening agent to flow out of the hardening tank 111 or to flow over the water stopping barrage 111k into the seed dropping port 111c.

Then, when the covered seeds in the hardening agent are guided by the guide paddles 113b to a point in the reaction tank 111b immediately behind the water stopping barrage 111k, the front ends of the guide paddles 113b move upward following the inclined surface 111m of the water stopping barrage 111k with a small gap therebetween as the belt 113f circulates along the circumferential surface of the upper pulley 113e. As the guide paddles 113b turn upward, the covered seeds in the hardening agent are pushed by the guide paddles 113b and ride on the inclined surface 111m of the water stopping barrage 111k. Just when the front ends of the guide paddles 113b reach the height of the apex of the water stopping barrage 111k, the covered seeds roll onto the front surface of the water stopping barrage 111k opposite the inclined surface 111m and fall into the seed dropping port 111c.

Until they are thrown into the seed dropping port 111c, the covered seeds that have dropped out of the valves 73b of the plunger 73h in the nozzle block 73 are immersed in the hardening agent for a specified time to turn the gelling agent enclosing the seeds into gel through reaction of the gelling agent with the hardener, thus making gel-covered seeds. Because the left and right inner walls of the seed dropping port 111c and the barrier plate 111n are inclined, the gel-covered seeds, even if some hardening agent adheres to them, will reliably fall into the water cleaning tank 131 near the front plate 131a arranged below the seed dropping port 111c.

As can be seen from the above, the direction in which the gel guide mechanism 113 of the gel hardening section 11 guides the covered seeds from the feed liquid tank 111a over the water stopping barrage 111k into the seed dropping port 111c in the hardening tank 111, i.e., the horizontal direction of the guiding, is represented by the arrow Y in FIG. 16.

When the hardening agent decreases in density and amount as the grainlike covered seeds that have fallen off the valves 73b of the plunger 73h of the nozzle block 73 are immersed in the hardening agent for a specified period of time to react with it and harden, the liquid level of the hardening agent in the hardening tank 111 goes below the predetermined level which is between the upper and lower ends of the water stopping barrage 111k and becomes lower than the through-hole 115e of the cap 115b that is opened by the lifted rubber plug 115g. As a result the high-density hardening agent in the reserve tank 115a flows out through a gap between the circumferential surface of the slide pin 115f pushed in by the engagement projection 111t of the tank holder 111r and the through-hole 115e of the cap 115b and enters into the tank holder 111r, where it mixes with the spent hardening agent removed of the hardened, covered seeds which has flowed from the reaction tank 111b through the detour liquid passage 111e into the tank holder 111r.

Then, when the supply of the high-density hardening agent from the reserve tank 115a raises the density of the hardening agent in the hardening tank 111 and recovers the hardening agent level to the specified position, the hardening agent level becomes higher than the position of the through-hole 115e of the cap 115b opened by the lifted rubber plug 115g, stopping the inflow of the hardening agent into the hardening tank 111. In this way, the level of the hardening agent in the hardening tank 111 is always kept at the specified position between the upper and lower ends of the water stopping barrage 111k and the density of the hardening agent at an appropriate level for hardening the covered seeds.

The gel-covered seeds that have fallen into the water cleaning tank 131 near the front plate 131a are guided toward the rear plate 131b by a water flow in the water cleaning tank 131 created by the screw feeder 133a driven by a motor not shown and running from the front plate 131a toward the rear plate 131b and also by the apparent motion of the submerged part of the spiral blade 133c from the front plate 131a toward the rear plate 131b as the screw feeder 133a rotates.

When the gel-covered seeds arrive at a point immediately before the rear plate 131b, they are scooped up with the spiral blade 133c on the rear plate 131b side that is moving up from within the cleaning water as the screw feeder 133a turns.

As explained above, until the gel-covered seeds are scooped up by the spiral blade 133c from within the cleaning water, the gel-covered seeds that have fallen from the seed dropping port 111c of the hardening tank 111 into the water cleaning tank 131 near the front plate 131a are immersed in the cleaning water and cleaned with it while being moved through the cleaning water for a predetermined duration of time. Because the spiral blade 133c that has scooped up the gel-covered seeds as the screw feeder 133a rotates inclines downwardly toward the rear plate 131b, the cleaned gel-covered seeds roll along the inclined spiral blade 133c, passing over the lower end of the notch 131e of the rear plate 131b onto the water separating plate 135e.

After they have moved out of the tank body portion 53b of the seed tank 53 until they are thrown into the seed dropping port 111c of the hardening tank 111, the eight seeds or the grains of gelling agent enclosing the seeds are arranged in a lateral line in the gel-covering apparatus 1 and transferred, moved and processed parallelly. Because the seed dropping port 111c has a downwardly decreasing lateral width, the grains of gelling agent thrown into the seed dropping port 111c collect into a group so that in the gel cleaning section 13 the eight grains are cleaned as one group.

Some cleaning water scooped up together with the gel-covered seeds onto the water separating plate 135e by the spiral blade 133c as well as the cleaning water adhering to the gel-covered seeds is left to pass through the slits 135f and flow out of the water separating box 135a through the water discharge port 135g. The gel-covered seeds thrown onto the water separating plate 135e and cleared of water roll down the inclined water separating plate 135e and are discharged from the water separating box 135a through the seed discharge port 135h into the seed receiving cage 135c. Then, in the seed receiving cage 135c the cleaning water adhering to the gel-covered seeds is allowed to fall by its own weight through the mesh of the seed receiving cage 135c and onto the bottom of the water discharge pan 135b, from which it is drained through the discharge valve 135j of the discharge port.

As can be seen from the above description, the direction in plan view in which the gel guide mechanism 133 of the gel cleaning section 13 guides the gel-covered seeds through the cleaning water in the water cleaning tank 131 from the front plate 131a to the notch 131e of the rear plate 131b, i.e., the horizontal component of the guiding direction, is represented by the arrow Z of FIG. 16 and 18.

As described above, in the gel-covering apparatus 1 of this embodiment, the covered seeds dropped from the valves 73b of the gel covering section 7 are made to fall into the front half of the feed liquid tank 111a on the reaction tank 111b side of the flow regulating barrage 111g in the hardening tank 111 of the gel hardening section 11. The covered seeds immersed in the liquid hardener are moved through the hardener in the direction Y by the guide paddles 113b as the guide paddles 113b enter into the hardener in the reaction tank 111b from the feed liquid tank 111a side and move through the reaction tank 111b toward the inclined surface 111m of the water stopping barrage 111k, at which the guide paddles 113b get out of the hardener.

According to the ratio between the lateral size of the gel-covering apparatus 1, i.e., the size of the guide paddles 113b in the lateral direction of the hardening tank 111, and the size of the covered seeds, this embodiment can perform the process of hardening the gelling agent adhering to the surfaces of the seeds parallelly for eight seeds at one time. This in turn enables the apparatus to deal with the parallel processing for a plurality of covered seeds that enhances the gelling agent hardening processing capacity and therefore the overall processing capacity of the gel-covering apparatus 1.

With the gel-covering apparatus 1 of this embodiment, the gel guide mechanism 113, that moves the guide paddles 113b through the reaction tank 111b from the feed liquid tank 111a side to the inclined surface 111m of the water stopping barrage 111k, comprises a pair of pulleys 113e, a belt 113f wound around these pulleys 113e and having guide paddles 113b erected thereon, and a motor 113c for driving the belt 113f through the pulleys 113e.

By adjusting the rotation speed of the motor 113c, it is possible to adjust the time it takes the guide paddles 113b to move through the reaction tank 111b from the feed liquid tank 111a side to the inclined surface 111m of the water stopping barrage 111k. This makes it possible to keep constant the time it takes the covered seeds, which were dropped from the valves 73b of the gel covering section 7 into the hardener, to be scooped out of the hardener, which in turn keeps constant the reaction time in which the covered seeds react with the hardener as well as the extent to which the gelling agent is hardened.

Because, at the water stopping barrage 111k, the covered seeds are pushed by the guide paddles 113b along the inclined surface 111m to get out of the hardener and are further pushed by the guide paddles 113b to ride over the apex of the water stopping barrage 111k and fall into the seed dropping port 111c, the guide paddles 113b can serve two functions of guiding the covered seeds through the liquid hardener and moving the covered seeds out of the hardener, making the construction of the apparatus simple.

Further, in this gel-covering apparatus 1 of this embodiment, as the covered seeds are immersed in the liquid hardener for a specified duration to react with the hardener, the density and the overall amount of the hardener in the hardening tank 111 decreases. When the level of the liquid hardener in the hardening tank 111 goes below the specified position between the upper and lower end of the water stopping barrage 111k and becomes lower than the position of the through-hole 115e of the cap 115b that is opened by the lifted rubber plug 115g, the high-density hardener in the reserve tank 115a flows out through a gap between the circumferential surface of the slide pin 115f pushed in by the engagement projection 111t of the tank holder 111r and the through-hole 115e of the cap 115b and enters into the tank holder 111r, where it mixes with the spent hardening agent which was removed of the hardened, covered seeds and which has flowed from the reaction tank 111b through the detour liquid passage 111e into the tank holder 111r.

Then, when the supply of the high-density hardening agent from the reserve tank 115a raises the density of the hardening agent in the hardening tank 111 and recovers the hardening agent level to the specified position, the hardening agent level becomes higher than the position of the through-hole 115e of the cap 115b opened by the lifted rubber plug 115g, stopping the inflow of the hardening agent into the hardening tank 111.

Hence, the supply of high-density liquid hardener, necessary to keep the level of the harder in the hardening tank 111 at the specified position between the upper and lower ends of the water stopping barrage 111k and the density of the hardener at a level higher than the one required for hardening the covered seeds, can be performed virtually automatically without having to monitor the level of the liquid hardener in the hardening tank 111. Because the hardener in the hardening tank 111 and the high-density hardener from the reserve tank 115a are mixed in the tank holder 111r, the density of the liquid hardener can be prevented from varying greatly in the middle of the hardening tank 111, as would otherwise occur if the high-density hardener of the reserve tank 115a directly flowed into the reaction tank 111b where the covered seeds are immersed in the hardener somewhere between the front half of the feed liquid tank 111a on the reaction tank 111b side of the flow regulating barrage 111g and a location in the reaction tank 111b slightly upstream of the water stopping barrage 111k.

Figure 20:
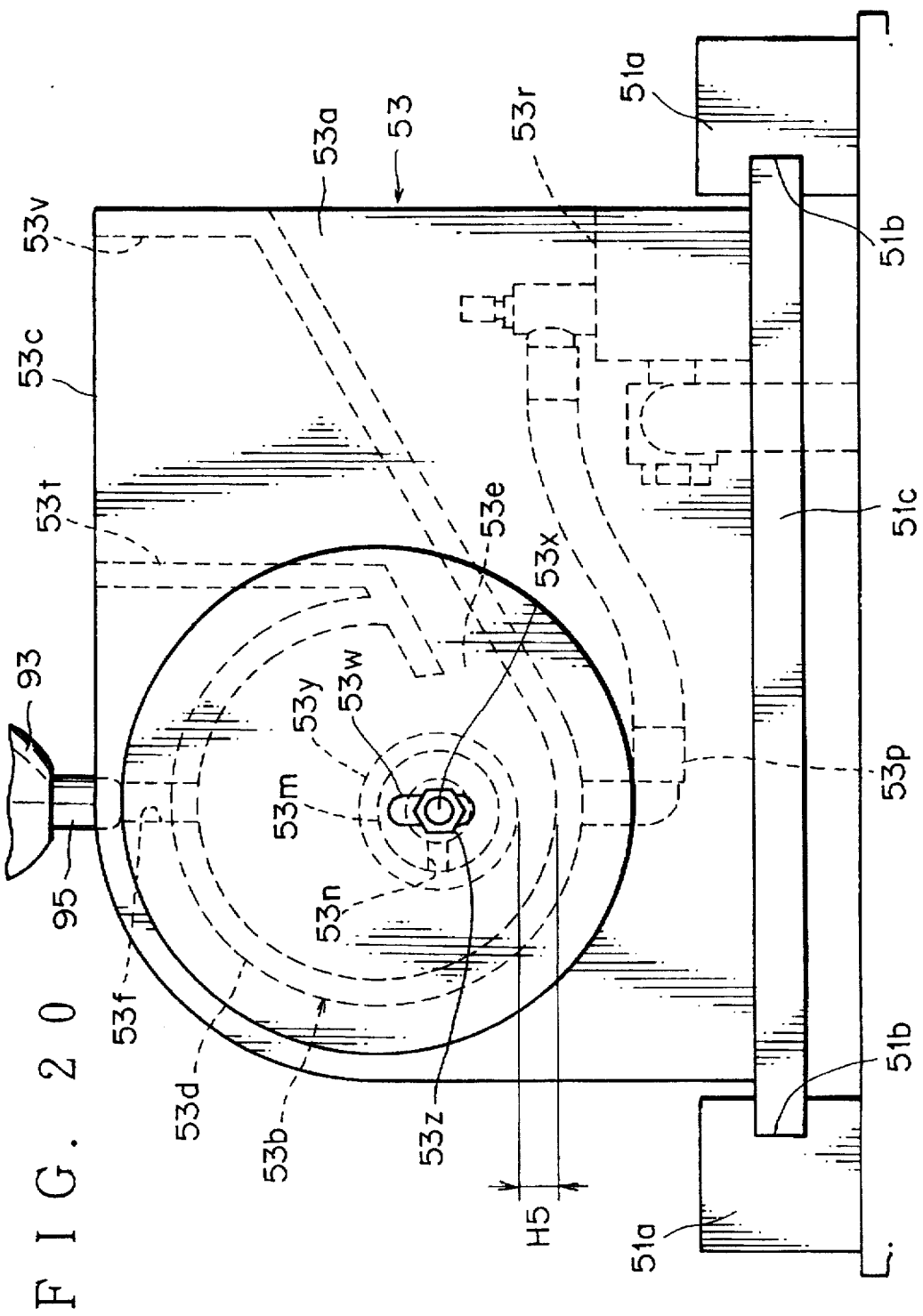
FIG. 20 is an enlarged side view of an essential portion of another embodiment of an air chamber in the tank body shown in FIG. 7.

In this embodiment, the amount of seeds accommodated in the tank body portion 53b from the hopper portion 53c of the seed supply section 5 does not depend on the amount of seeds thrown into the hopper portion 53c but is determined by the vertical width H1 of the slit 53e that communicates the hopper portion 53c with the tank body portion 53b. This is also affected to some extent by the distance H3 from the bottom inner circumferential surface of the tank body portion 53b to the air chamber 53m. As shown in FIG. 20 representing the essential-part enlarged side view, the distance H5 from the bottom inner circumferential surface of the tank body portion 53b to the air chamber 53m may be made adjustable so that the amount of seeds accommodated into the tank body portion 53b from the hopper portion 53c of the seed supply section 5 in addition to the amount of seeds agitated in the tank body portion 53b may be made adjustable mainly according to this distance H5.

The construction of the seed tank 53 in the above case is briefly explained below. The side walls 53a of the seed tank 53 are formed with vertically elongate slots 53w. The air chamber 53m that extends through the tank body portion 53b between the side walls 53a are provided at its ends with blank plates 53y larger in diameter than the air chamber 53m. Bolts 53x projecting outwardly from almost the center of the blank plates 53y are inserted from inside the side walls 53a into the slots 53w. Nuts 53z are screwed over the ends of the bolts 53x projecting from the side walls 53a and, by vertically moving the position of the bolts 53x through the slots 53w the vertical height H5 of the air chamber 53m can be adjusted. The blank plates 53y are so sized in diameter that they can cover the entire slots 53w whatever position in the slots 53w the bolts 53x may assume.

Figure 21:
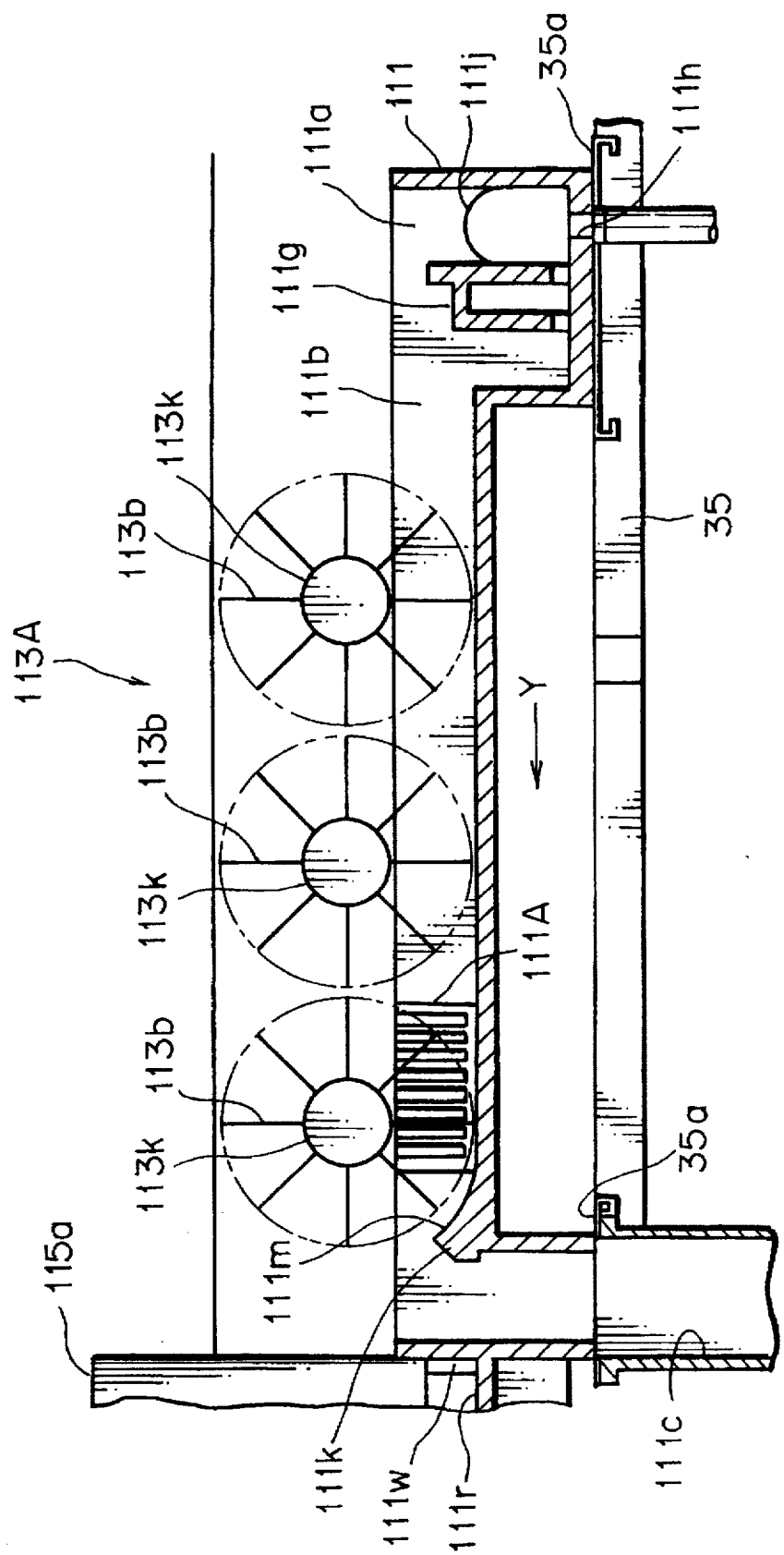
FIG. 21 is an enlarged side cross section of an essential portion of another embodiment of a gel guide mechanism in the gel hardening section shown in FIG. 16.
Figure 22:
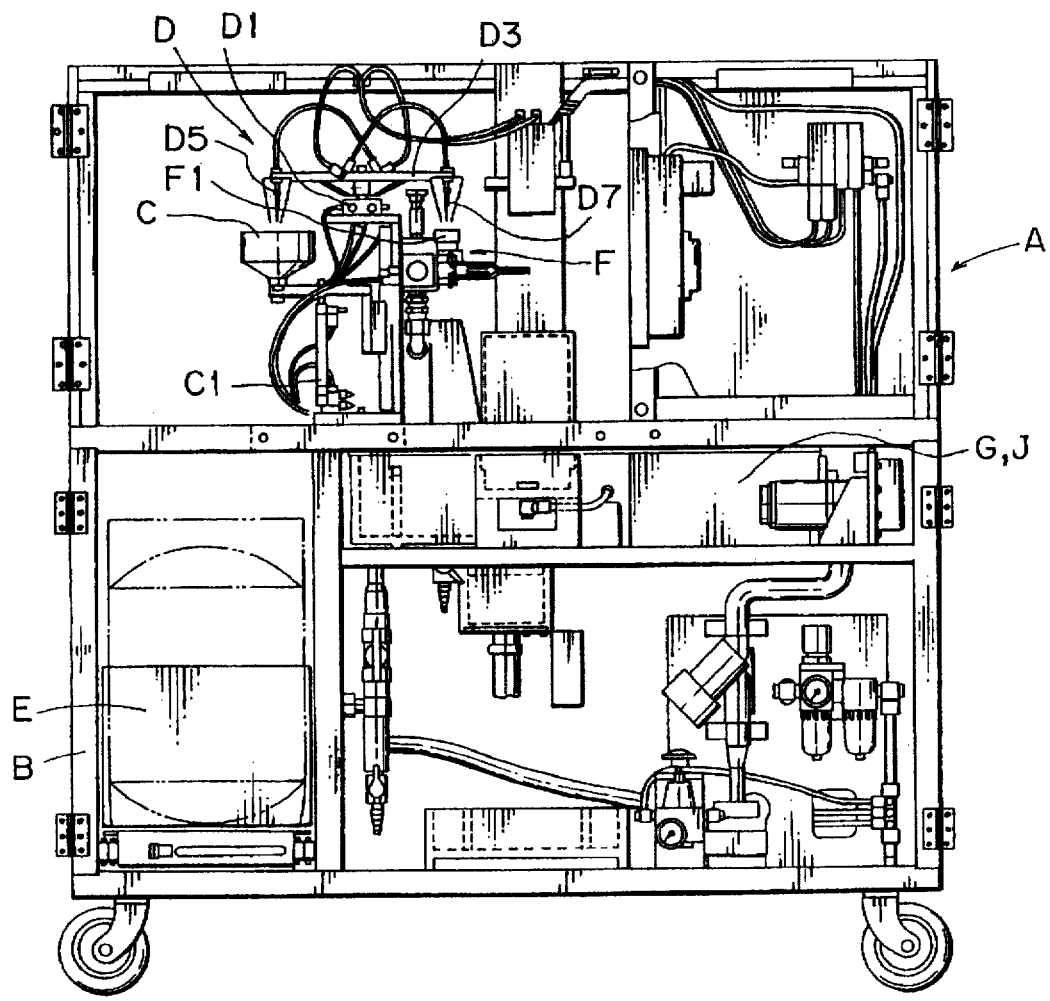
FIG. 22 is a front view of a conventional gel-covering apparatus.
Figure 23:
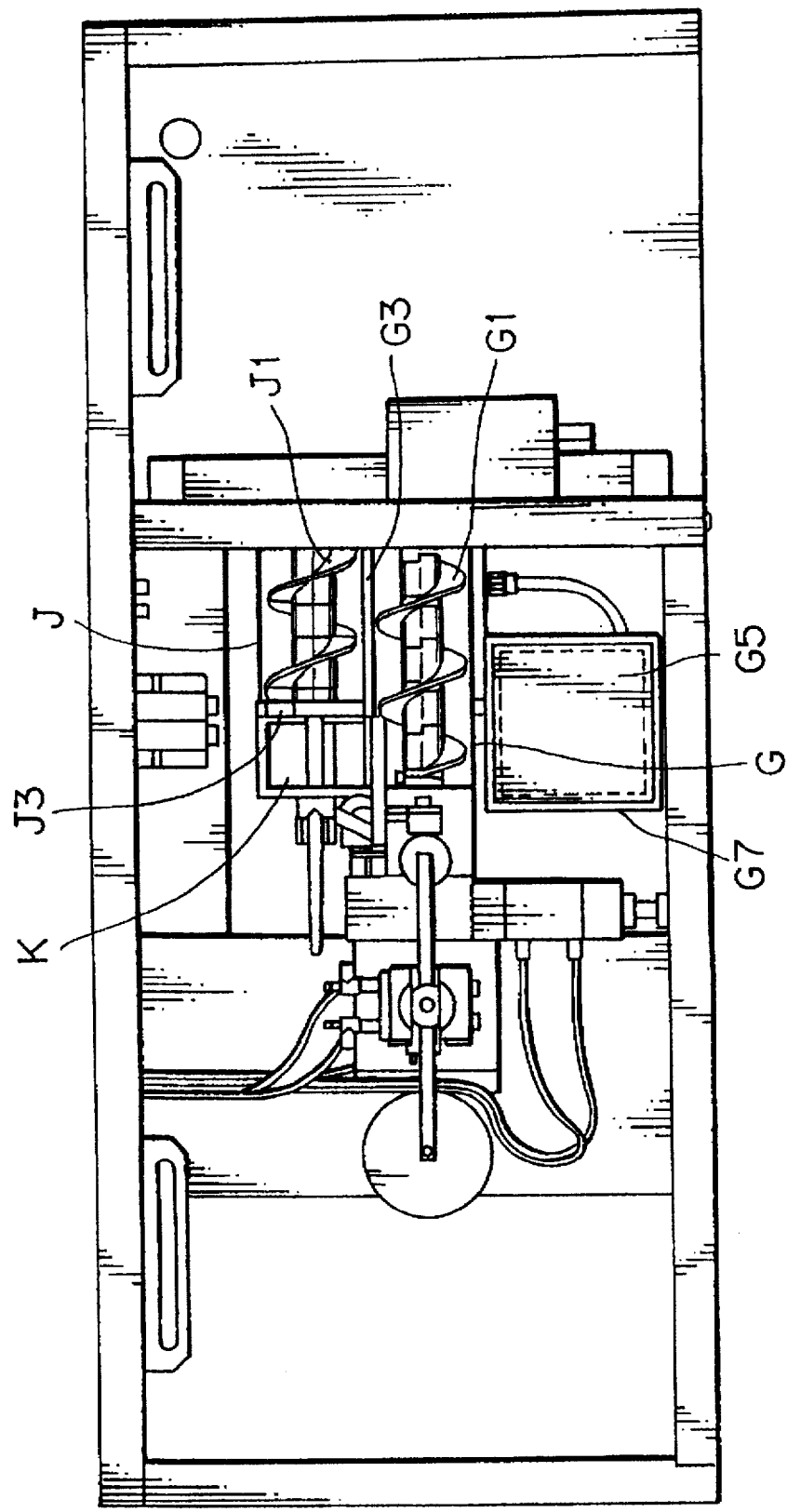
FIG. 23 is a plan view of the conventional gel-covering apparatus shown in FIG. 22.

While in this embodiment the guide paddles 113b of the gel guide mechanism 113 for guiding the covered seeds through the hardening agent in the hardening tank 111 are vertically erected on the surface of the belt 113f of the belt conveyor 113a at equal intervals, they may be erected on other than the belt conveyor 113a. For example, as shown in FIG. 21 representing the enlarged side cross section of essential parts, a plurality of rollers 113k with a length almost equal to the lateral width of the hardening tank 111 may be arranged at longitudinal intervals over the reaction tank 111b of the hardening tank 111 and a plurality of guide paddles 113b may be erected circumferentially spaced on the circumferential surface of each roller 113k in such a way that they project in radial directions to form the gel guide mechanism 113A. In this case, the guiding of covered seeds through the hardening agent in the hardening tank 111 is performed by rotating the rollers 113k to drive the guide paddles 113b of each roller 113k from the feed liquid tank 111a side to the water stopping barrage 111k side with the guide paddles dipping into and rising out of the hardening agent alternately.

Further, the gel-covering apparatus applying the present invention is not limited to the configuration of this embodiment of the gel-covering apparatus 1 having the seed supply section 5, gel covering section 7, seed transfer section 9, and gel cleaning section 13, but may have different configurations in other than the gel hardening section 11. In this embodiment the operation to harden the gelling agent covering the seeds is performed in the gel hardening section 11 parallelly on eight covered seeds arranged laterally in the hardening agent in the hardening tank 111. The number of gelling agent hardening processes performed parallelly on the seeds in the gel hardening section 11 may be less or more than eight.

As explained above, the covered seed hardening apparatus of this invention, comprises: a hardening tank containing a liquid hardener for hardening polymeric gelling agent that covers seeds to be processed; guide paddles having a width corresponding to a width dimension of the hardening tank, the width direction of the hardening tank crossing the direction in which the covered seeds are moved in the hardener, the guide paddles extending in the width direction parallel to the width direction of the hardening tank; and a paddle drive mechanism for moving the guide paddles in the harder in the hardening tank from a guide start point to a guide end point to move the covered seeds through the hardener; wherein the seeds covered with the polymeric gelling agent are thrown into the hardener in the hardening tank at the guide start point and moved by the guide paddles in the hardener flowing from the guide start point toward the guide end point to cause the gelling agent of the seeds to react with the hardener and harden.

Therefore, the covered seeds in numbers corresponding to the ratio between the lateral width of the guide paddles and the size of the covered seeds can be guided through the liquid hardener by the guide paddles from the guide start point of the hardening tank to the guide end point. The apparatus can easily cope with the parallel hardening process for a plurality of gelling agent-covered seeds, which is intended to realize a substantial increase in processing capacity.

According to the covered seed hardening apparatus of this invention, the paddle drive mechanism comprises a pair of pulleys whose axes are directed in the width direction of the hardening tank and which are installed at locations corresponding to the guide start point and the guide end point, a belt wound around the pair of pulleys, and a circulation drive source for circulating the belt through the pulleys, the belt comprising two halves situated between the pair of pulleys and so disposed that one half of the belt faces the hardener and the other half of the belt faces the hardener through the first half of the belt; the guide paddles are erected on the outer circumferential surface of the belt at intervals in a circulation direction of the circulation drive source with the width direction of the guide paddles aligned with the rotating axis direction of the pulleys; the guide paddles erected on the second half of the belt are situated outside the hardener and moved from the guide end point toward the guide start point by the circulation drive source; and the guide paddles erected on the first half of the belt are situated in the hardener and moved from the guide start point toward the guide end point by the circulation drive source Thus, by adjusting the circulation time of the belt driven by the circulation drive source, it is possible to keep constant the time during which the covered seeds are immersed in the liquid hardener to cause the gelling agent covering the seeds to be hardened by the hardener. Further, in the hardening tank excluding a portion ranging from the guide start point to the guide end point, where the guide paddles are outside the hardener, it is possible to prevent disturbance of flow of the liquid hardener, as would be caused by the moving guide paddles.

According to the covered seed hardening apparatus of this invention, the paddle drive mechanism comprises a plurality of rollers spaced in the direction of movement of the covered seeds, with the axes of the rollers directed in the width direction of the hardening tank, and a rotation drive source for rotating the rollers in the same rotation directions; the guide paddles are erected on the circumferential surface of each of the rollers at intervals in the circumferential direction, with the width direction of the paddles aligned in the rotation axis direction of the rollers; the rollers are so disposed that the guide paddles erected on a circumferential part of the rollers facing the hardener are situated in the hardener and that the guide paddles erected on a circumferential part of the rollers opposite the circumferential part facing the hardener with the rotating axis of each roller between the opposing circumferential parts are situated outside the hardener; and the guide paddles situated in the hardener are moved in the hardener by the rotation drive source in the seed moving direction.

Therefore, as in the covered seed hardening apparatus described, by adjusting the rotation time of the rollers driven by the rotation drive source, it is possible to keep constant the time during which the covered seeds are immersed in the liquid hardener to cause the gelling agent covering the seeds to be hardened by the hardener. Further, in the hardening tank excluding a portion ranging from the guide start point to the guide end point, where the guide paddles are outside the hardener, it is possible to prevent disturbance of flow of the liquid hardener, as would be caused by the moving guide paddles.

According to the covered seed hardening apparatus of this invention, a water stopping barrage is formed at a hardening tank portion downstream, in the seed moving direction, of the guide end point to prevent inflow of the hardener to the downstream side of the hardening tank portion; a barrage surface on the guide start point side of the water stopping barrage is formed following the locus of the front end of the guide paddles moving from within the hardener to the outside; and at a hardening tank portion downstream, in the seed moving direction, of the water stopping barrage a seed dropping port communicating with the outside of the hardening tank is formed; and the covered seeds at the guide end point are pushed by the guide paddles to ride over the barrage surface and come out of the hardener together with the guide paddles and, as the guide paddles rise above the water stopping barrage, the covered seeds fall from the guide paddle into the seed dropping port.

Hence, the operation of moving the covered seeds from within the liquid hardener to the outside can be performed by the guide paddles that also guide the covered seeds through the liquid hardener in the hardening tank from the guide start point to the guide end point.

The covered seed hardening apparatus of this invention, further comprises a return passage for returning the hardener at the hardening tank portion upstream, in the seed moving direction, of the water stopping barrage to the guide start point; and a reserve tank for holding a density adjusting hardener used to adjust the density of the hardener in the hardening tank, the reserve tank having a tank opening facing from above the hardener in the return passage; wherein when the level of the liquid hardener in the return passage parts from the tank opening, the density adjusting hardener flows out of the reserve tank into the return passage by its own weight through the tank opening and, when the level of the liquid hardener in the return passage reaches the tank opening, the outflow of the density adjusting hardener from the reserve tank is stopped by the pressure of the hardener in the return passage applied through the tank opening.

Because the density adjusting hardener is supplied from the reserve tank into the liquid hardener in the return passage excluding a portion of hardener ranging from the guide end point to the guide start point of the hardening tank where the covered seeds are moved, the density of the portion of the liquid hardener where the covered seeds are moved is prevented from changing while the covered seeds are moving. Thus, the degree of hardening of the gelling agent on the seeds does not vary, as it would if there were large variations in the density of liquid hardener when the covered seeds were moved. It is therefore possible to adjust virtually automatically the density and amount of the liquid hardener for hardening the gelling agent without affecting the process of hardening the covered seeds in the hardener.

According to the covered seed hardening apparatus of this invention, the guide paddles are formed with slits smaller in width than at least the covered seeds. Thus, when the guide paddles are driven through the liquid hardener, the covered seeds of sizes greater than the slit width are guided by the guide paddles from the guide start point side toward the guide end point side while at the same time allowing the hardener on the guide end point side of the guide paddles to escape through the slits of the paddles to the guide start point side. In this way the covered seeds can be guided in the liquid hardener reliably without disturbing the flow of the hardener.

The covered seed hardening apparatus of this invention, comprises: a hardening tank containing a liquid hardener for hardening polymeric gelling agent that covers seeds to be processed; a return passage for returning the hardener from a guide end point to a guide start point; and a reserve tank for holding a density adjusting hardener used to adjust the density of the hardener in the hardening tank, the reserve tank having a tank opening facing from above the hardener in the return passage; wherein the seeds covered with the polymeric gelling agent are thrown into the hardener in the hardening tank at the guide start point and moved in the hardening agent flowing from the guide start point to the guide end point to cause the gelling agent of the seeds to react with the hardener and harden, and the covered seeds with the hardened gelling agent are moved out of the hardener at the guide end point; wherein when the level of the liquid hardener in the return passage parts from the tank opening, the density adjusting hardener flows out of the reserve tank into the return passage by its own weight through the tank opening and, when the level of the liquid hardener in the return passage reaches the tank opening, the outflow of the density adjusting hardener from the reserve tank is stopped by the pressure of the hardener in the return passage applied through the tank opening.

Hence, as in the covered seed hardening apparatus described, because the density adjusting hardener is supplied from the reserve tank into the liquid hardener in the return passage excluding a portion of hardener ranging from the guide end point to the guide start point of the hardening tank where the covered seeds are moved, the density of the portion of the liquid hardener where the covered seeds are moved is prevented from changing while the covered seeds are moving. Thus, the degree of hardening of the gelling agent on the seeds does not vary, as it would if there were large variations in the density of liquid hardener when the covered seeds were being moved. It is therefore possible to adjust virtually automatically the density and amount of the liquid hardener for hardening the gelling agent without affecting the process of hardening the covered seeds in the hardener.

Having now fully described the invention, it will be apparent to one of ordinary skill in the art that many changes and modifications can be made thereto without departing from the spirit and scope of the invention as set forth herein.

What is claimed is:

1. An apparatus for hardening covered seeds comprising:
   a hardening tank containing a liquid hardener for hardening a polymeric gelling agent that covers seeds to be processed to form said covered seeds;
   guide paddles having a width corresponding to a width dimension of said hardening tank, a width direction of said hardening tank crossing a direction in which said covered seeds are moved in said liquid hardener, said guide paddles extending, within said hardening tank, in a width direction parallel to said width direction of said hardening tank; and
   a paddle drive mechanism, connected to said guide paddles, for moving said guide paddles in said liquid hardener in said hardening tank from a guide start point to a guide end point to move said covered seeds through said liquid hardener;
   wherein said covered seeds covered with said polymeric gelling agent thereon are thrown into said liquid hardener in said hardening tank at said guide start point toward said guide end point to cause said polymeric gelling agent of said covered seeds to react with said liquid hardener and harden.

2. The apparatus for hardening covered seeds as claimed in claim 1, wherein said paddle drive mechanism comprises a pair of pulleys with each pulley having an axis which is directed in said width direction of said hardening tank and said pair of pulleys being installed at locations corresponding to said guide start point and said guide end point, a belt wound around said pair of pulleys, and a circulation drive source for circulating said belt through said pulleys, said belt comprising two halves situated between said pair of pulleys and so disposed that a first half of said belt faces said liquid hardener and a second half of said belt faces said liquid hardener through said first half of said belt; said guide paddles are erected on an outer circumferential surface of said belt at intervals in a circulation direction of said belt by a circulation drive source with said width direction of said guide paddles aligned with a rotating axis direction of said pulleys; said guide paddles erected on said second half of said belt are situated outside said liquid hardener and moved from said guide end point toward said guide start point by said circulation drive source; and said guide paddles erected on said first half of said belt are situated in said liquid hardener and moved from said guide start point toward said guide end point by said circulation drive source.

3. The apparatus for hardening covered seeds as claimed in claim 2, wherein a hardener stopping barrage at a hardening tank portion downstream, in a direction of movement of said covered seeds, of said guide end point to prevent outflow of said liquid hardener to a downstream side of said hardening tank portion; a barrage surface on a same side as said guide start point of said hardener stopping barrage follows a locus of a front end of said guide paddles moving from within said liquid hardener to an outside thereof; and at said hardening tank portion downstream, in said direction of movement of said covered seeds, of said hardener stopping barrage, a seed dropping port communicating with said outside of said hardening tank; and said covered seeds at said guide end point are pushed by said guide paddles to ride over said barrage surface and come out of said liquid hardener together with said guide paddles and, as said guide paddles rise above said hardener stopping barrage, said covered seeds fall from said guide paddles into said seed dropping port.

4. The apparatus for hardening covered seeds as claimed in claim 3, further comprising a return passage for returning said liquid hardener at said hardening tank portion, in said direction of movement of said covered seeds, upstream of said hardener stopping barrage to said guide start point; and a reserve tank for holding a density adjusting hardener used to adjust a density of said liquid hardener in said hardening tank, said reserve tank having a tank opening facing from above said liquid hardener in said return passage; wherein when a level of said liquid hardener in said return passage parts from said tank opening, said density adjusting hardener flows out of said reserve tank into said return passage by said density adjusting hardener's own weight through said tank opening and, when said level of said liquid hardener in said return passage reaches said tank opening, an outflow of said density adjusting hardener from said reserve tank is stopped by a pressure of said liquid hardener in said return passage applied through said tank opening.

5. The apparatus for hardening covered seeds as claimed in claim 4, wherein said guide paddles have slits smaller in width than at least a width of said covered seeds.

6. The apparatus for hardening covered seeds as claimed in claim 3, wherein said guide paddles have slits smaller in width than at least a width of said covered seeds.

7. The apparatus for hardening covered seeds as claimed in claim 1, wherein said paddle drive mechanism comprises a plurality of rollers spaced in a direction of movement of said covered seeds, each roller of said plurality of rollers having an axis directed in said width direction of said hardening tank, and a rotation drive source for rotating each roller of said plurality of rollers in a same direction of rotation; said guide paddles are erected on a circumferential surface of each roller of said plurality of rollers at intervals in a circumferential direction, with said width direction of said guide paddles aligned in a direction of rotation of said axis of each roller of said plurality of rollers; each roller of said plurality of rollers being so disposed that said guide paddles erected on a first circumferential part of each roller of said plurality of rollers facing said liquid hardener are situated in said liquid hardener and that said guide paddles erected on a second circumferential part of each roller of said plurality of rollers opposite said first circumferential part with said axis of rotation of each roller of said plurality of rollers between said first and second circumferential parts, which are opposed to each other, being situated outside said liquid hardener; and said guide paddles situated in said liquid hardener are moved in said liquid hardener by said rotation drive source in said direction of movement of said covered seeds.

8. The apparatus for hardening covered seeds as claimed in claim 7, wherein a hardener stopping barrage at a hardening tank portion, in said direction of movement of said covered seeds, downstream of said guide end point to prevent outflow of said liquid hardener to a downstream side of said hardening tank portion; a barrage surface on a same side as said guide start point of said hardener stopping barrage follows a locus of a front end of said guide paddles moving from within said liquid hardener to an outside thereof; and at said hardening tank portion downstream, in said direction of movement of said covered seeds, of said hardener stopping barrage, a seed dropping port communicating with said outside of said hardening tank; and covered seeds at said guide end point are pushed by said guide paddles to ride over said barrage surface and come out of said liquid hardener together with said guide paddles and, as said guide paddles rise above said hardener stopping barrage, said covered seeds fall from said guide paddles into said seed dropping port.

9. The apparatus for hardening covered seeds as claimed in claim 8, further comprising a return passage for returning said liquid hardener at said hardening tank portion, in said direction of movement of said covered seeds, upstream of said hardener stopping barrage to said guide start point; and a reserve tank for holding a density adjusting hardener used to adjust a density of said liquid hardener in said hardening tank, said reserve tank having a tank opening facing from above said liquid hardener in said return passage; wherein when a level of said liquid hardener in said return passage parts from said tank opening, said density adjusting hardener flows out of said reserve tank into said return passage by said density adjusting hardener's own weight through said tank opening and, when said level of said liquid hardener in said return passage reaches said tank opening, an outflow of said density adjusting hardener from said reserve tank is stopped by a pressure of said liquid hardener in said return passage applied through said tank opening.

10. The apparatus for hardening covered seeds as claimed in any one of claims 1, 2, 7, 8 and 9, wherein said guide paddles have slits smaller in width than at least a width of said covered seeds.

11. The apparatus for hardening covered seeds as claimed in claim 1, wherein a hardener stopping barrage at a hardening tank portion downstream, in a direction of movement of said covered seeds, of said guide end point to prevent outflow of said liquid hardener to a downstream side of said hardening tank portion; a barrage surface on a same side as said guide start point of said hardener stopping barrage follows a locus of a front end of said guide paddles moving from within said liquid hardener to an outside thereof; and at said hardening tank portion downstream, in said direction of movement of said covered seeds, of said hardener stopping barrage, a seed dropping port communicating with said outside of said hardening tank; and said covered seeds at said guide end point are pushed by said guide paddles to ride over said barrage surface and come out of said liquid hardener together with said guide paddles and, as said guide paddles rise above said hardener stopping barrage, said covered seeds fall from said guide paddles into said seed dropping port.

12. The apparatus for hardening covered seeds as claimed in claim 11, further comprising a return passage for returning said liquid hardener at said hardening tank portion, in said direction of movement of said covered seeds, upstream of said hardener stopping barrage to said guide start point; and a reserve tank for holding a density adjusting hardener used to adjust a density of said liquid hardener in said hardening tank, said reserve tank having a tank opening facing from above said liquid hardener in said return passage; wherein when a level of said liquid hardener in said return passage parts from said tank opening, said density adjusting hardener flows out of said reserve tank into said return passage by said density adjusting hardener's own weight through said tank opening and, when said level of said liquid hardener in said return passage reaches said tank opening, an outflow of said density adjusting hardener from said reserve tank is stopped by a pressure of said liquid hardener in said return passage applied through said tank opening.

13. The apparatus for hardening covered seeds as claimed in claim 11, wherein said guide paddles have slits smaller in width than at least a width of said covered seeds.

14. The apparatus for hardening covered seeds as claimed in claim 12, wherein said guide paddles have slits smaller in width than at least a width of said covered seeds.

15. An apparatus for hardening covered seeds comprising:

a hardening tank containing a liquid hardener for hardening polymeric gelling agent that covers seeds to be processed;

a return passage for returning said liquid hardener from a guide end point to a guide start point; and a reserve tank for holding a density adjusting hardener used to adjust a density of said liquid hardener in said hardening tank, said reserve tank having a tank opening face from above said liquid hardener in said return passage;

wherein said covered seeds covered with said polymeric gelling agent are thrown into said hardener in said hardening tank at said guide start point and moved in said hardening agent from said guide start point to said guide end point to cause said gelling agent of said covered seeds to react with said liquid hardener and harden, and said covered seeds with said hardened gelling agent are moved out of said hardener at said guide end point; and wherein when a level of said liquid hardener in said return passage parts from said tank opening, said density adjusting hardener flows out of said reserve tank into said return passage by said density adjusting hardener's own weight through said tank opening and, when said level of said liquid hardener in said return passage reaches said tank opening, an outflow of said density adjusting hardener from said reserve tank is stopped by a pressure of said liquid hardener in said return passage applied through said tank opening.

\* \* \* \* \*